United States Patent
Harel et al.

(10) Patent No.: US 10,819,477 B2
(45) Date of Patent: Oct. 27, 2020

(54) DIGITAL WIRELESS DISTRIBUTED COMMUNICATIONS SYSTEM (WDCS) EMPLOYING A CENTRALIZED SPECTRUM CHUNK CONSTRUCTION OF COMMUNICATIONS CHANNELS FOR DISTRIBUTION TO REMOTE UNITS TO REDUCE TRANSMISSION DATA RATES

(71) Applicant: Corning Optical Communications LLC, Hickory, NC (US)

(72) Inventors: Dror Harel, Hod Hasharon (IL); Gavriel Mizrahi, Tel Aviv (IL)

(73) Assignee: Corning Optical Communications LLC, Charlotte, NC (US)

( * ) Notice: Subject to any disclaimer, the term of this patent is extended or adjusted under 35 U.S.C. 154(b) by 27 days.

(21) Appl. No.: 16/374,441

(22) Filed: Apr. 3, 2019

(65) Prior Publication Data

US 2019/0296871 A1    Sep. 26, 2019

Related U.S. Application Data

(63) Continuation of application No. PCT/IL2017/051125, filed on Oct. 3, 2017.

(Continued)

(51) Int. Cl.
*H04L 5/00* (2006.01)
*H04W 88/08* (2009.01)
*H04L 12/701* (2013.01)

(52) U.S. Cl.
CPC .......... *H04L 5/0042* (2013.01); *H04L 5/0023* (2013.01); *H04L 5/0044* (2013.01); *H04L 5/0064* (2013.01); *H04W 88/085* (2013.01)

(58) Field of Classification Search
None
See application file for complete search history.

(56) References Cited

U.S. PATENT DOCUMENTS 7,672,359 B2    3/2010  Cleary et al.
8,532,242 B2    9/2013  Fischer et al.
(Continued)

FOREIGN PATENT DOCUMENTS

| EP | 2574138 A1 | 3/2013 |
|---|---|---|
| EP | 3136669 A1 | 3/2017 |
| WO | 2015172277 A1 | 11/2015 |

OTHER PUBLICATIONS

International Search Report and Written Opinion for International Patent Application No. PCT/IL2017/051125, dated Jan. 18, 2018, 13 pages.
(Continued)

*Primary Examiner* — Scott M Sciacca
(74) *Attorney, Agent, or Firm* — C. Keith Montgomery

(57) ABSTRACT

Digital wireless distributed communications systems (WDCS) employing a centralized spectrum chunk construction of communications channels for distribution to remote units are disclosed. Individual, discrete communications channels received from one or more signal sources are centrally constructed into spectrum chunks before being distributed to remote units. When the communications channels are constructed into spectrum chunks, the individual communications channels are positioned in their respective defined center radio frequency (RF) frequencies of their respective communications band before being distributed to the remote units. Thus, the remote units do not have to include the additional cost and associated power consumption of processing circuitry to construct the communications bands for individual communications channels. The remote units can up-convert the received spectrum chunks, which have already been centrally band constructed, to their respective frequencies according to their communication band(s).

26 Claims, 13 Drawing Sheets

Related U.S. Application Data

(60) Provisional application No. 62/405,346, filed on Oct. 7, 2016.

(56) References Cited

U.S. PATENT DOCUMENTS

| | | |
|---|---|---|
| 8,837,659 B2 | 9/2014 | Uyehara et al. |
| 8,948,155 B2 | 2/2015 | Cannon et al. |
| 9,332,402 B2 | 5/2016 | Wala |
| 2010/0177760 A1 | 7/2010 | Cannon et al. |
| 2015/0229386 A1* | 8/2015 | Lange .................... H04B 7/155 370/317 |
| 2017/0222869 A1* | 8/2017 | Guo ...................... H04W 24/04 |
| 2017/0257151 A1* | 9/2017 | Lange .................... H04L 67/10 |
| 2018/0097659 A1* | 4/2018 | Hanson ............... H04L 12/5601 |

OTHER PUBLICATIONS

International Preliminary Report on Patentability for International Patent Application No. PCT/IL2017/051125, dated Apr. 18, 2019, 12 pages.

\* cited by examiner

ANALOG DOWN CONVERTER
IMPLEMENTED AS I/Q MODULATOR

DIGITAL WIRELESS DISTRIBUTED COMMUNICATIONS SYSTEM (WDCS) EMPLOYING A CENTRALIZED SPECTRUM CHUNK CONSTRUCTION OF COMMUNICATIONS CHANNELS FOR DISTRIBUTION TO REMOTE UNITS TO REDUCE TRANSMISSION DATA RATES

CROSS-REFERENCE TO RELATED APPLICATIONS

This application is a continuation of International Application No. PCT/IL2017/051125 filed on Oct. 3, 2017, which claims the benefit of priority to U.S. Provisional Application Ser. No. 62/405,346 filed on Oct. 7, 2016, the content of which is relied upon and incorporated herein by reference in its entirety.

BACKGROUND

The disclosure relates generally to wireless distributed communications systems (WDCS), and more particularly to a digital WDCS employing a centralized spectrum chunk construction of communications channels for distribution to remote units to reduce transmission data rates.

Wireless customers are increasingly demanding wireless communications services, such as cellular communications services and Wi-Fi services. Thus, small cells, and more recently Wi-Fi services, are being deployed indoors. At the same time, some wireless customers use their wireless communication devices in areas that are poorly serviced by conventional cellular networks, such as inside certain buildings or areas where there is little cellular coverage. One response to the intersection of these two concerns has been the use of distributed antenna systems (DASs). DASs include remote antenna units (RAUs) configured to receive and transmit communications signals to client devices within the antenna range of the RAUs. DASs can be particularly useful when deployed inside buildings or other indoor environments where the wireless communication devices may not otherwise be able to effectively receive radio frequency (RF) signals from a source.

In this regard, FIG. 1 illustrates a wireless distributed communications system (WDCS) 100 that is configured to distribute communications services to remote coverage areas 102(1)-102(N), where 'N' is the number of remote coverage areas. The WDCS 100 in FIG. 1 is provided in the form of a DAS 104. The DAS 104 can be configured to support a variety of communications services that can include cellular communications services, wireless communications services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on RAUs 106(1)-106(N) connected to a centralized equipment 108 (e.g., a head-end controller, a central unit, or a head-end unit). The centralized equipment 108 may be communicatively coupled to a source transceiver 110, such as for example, a base transceiver station (BTS) or a baseband unit (BBU). In this regard, the centralized equipment 108 receives downlink communications signals 112D from the source transceiver 110 to be distributed to the RAUs 106(1)-106(N). The downlink communications signals 112D can include data communications signals and/or communication signaling signals, as examples. The centralized equipment 108 is configured with filtering circuits and/or other signal processing circuits that are configured to support a specific number of communications services in a particular frequency bandwidth (i.e., frequency communications bands). The downlink communications signals 112D are communicated by the centralized equipment 108 over the communications link 114 over their frequency to the RAUs 106(1)-106(N).

With continuing reference to FIG. 1, the RAUs 106(1)-106(N) are configured to receive the downlink communications signals 112D from the centralized equipment 108 over a communications link 114. The downlink communications signals 112D are configured to be distributed to the respective remote coverage areas 102(1)-102(N) of the RAUs 106(1)-106(N). The RAUs 106(1)-106(N) are also configured with filters and other signal processing circuits that are configured to support all or a subset of the specific communications services (i.e., frequency communications bands) supported by the centralized equipment 108. In a non-limiting example, the communications link 114 may be a wired communications link, a wireless communications link, or an optical fiber-based communications link. Each of the RAUs 106(1)-106(N) may include an RF transmitter/receiver (not shown) and a respective antenna 116(1)-116(N) operably connected to the RF transmitter/receiver to wirelessly distribute the communications services to user equipment (UE) 118 within the respective remote coverage areas 102(1)-102(N). The RAUs 106(1)-106(N) are also configured to receive uplink communications signals 112U from the UE 118 in the respective remote coverage areas 102(1)-102(N) to be distributed to the source transceiver 110.

No admission is made that any reference cited herein constitutes prior art. Applicant expressly reserves the right to challenge the accuracy and pertinency of any cited documents.

SUMMARY

Embodiments of the disclosure relate to digital wireless distributed communications systems (WDCS) employing a centralized spectrum chunk construction of communications channels for distribution to remote units. A spectrum chunk is a representation of grouped communications channels within a range of frequencies where the bandwidth of the spectrum chunk is equal to or greater than the aggregated bandwidths of the individual communications channels. In aspects disclosed herein, individual, discrete communications channels received from one or more signal sources are centrally constructed into spectrum chunks (e.g. spectrum radio-frequency (RF) chunks) before being distributed to remote units as spectrum chunk streams. When the communications channels are constructed into spectrum chunks, the individual communications channels are positioned in their respective defined center frequencies of their respective communications band before being distributed to the remote units. Thus, the remote units do not have to include the additional cost and associated power consumption of processing circuitry to construct the communications bands for individual communications channels. The remote units can up-convert the received spectrum chunks, which have already been centrally band constructed, to their respective frequencies according to their communication band(s). Further, by providing centralized spectrum chunk construction of communications channels for distribution to remote units, the entire frequency bandwidth of a communications band does not have to be distributed to remote units, wherein portions of the frequency bandwidth may not include communications channels, but still consumes available transmission data rate. Thus, by centrally constructing spectrum chunks of communications channels to be distributed to remote units, transmission data rates can be reduced over transmitting the entire bandwidth of the communications band to the remote units for distributing the communications channels.

In this regard, in one exemplary aspect, a digital WDCS is provided that includes a central unit configured to distribute digital communications signals to a plurality of remote units. For example, the WDCS may be a distributed antenna system (DAS) that includes a central unit configured to distribute digital communications signals to remote antenna units. The central unit is configured to receive individual communications channels from a plurality of signal sources to be distributed to the remote units. For example, the signal sources could be digital signal sources that communicate digital communications channels (e.g., in baseband) to the central unit. Alternatively or in addition, the signal sources could be analog signal sources that communicate analog communications channels to the central unit, which are then converted into digital communications signals. In aspects disclosed herein, the central unit is configured to combine combinations of received individual communications channels of a communications service(s) to construct one or more spectrum chunks (i.e., a representation of communications channels within a range of frequencies) to be distributed to the remote units for distribution to client devices. In this manner, it is not necessary for the central unit to communicate the entire frequency bandwidth of the communications services to the remote units wherein portions of the frequency bandwidth of the communications service may be unused, but yet still consume available transmission data rate.

In other aspects, by providing centralized construction of spectrum chunks of communications channels for distribution to remote units, the remote units in the digital WDCS are not required to perform band-level communications signal construction. This avoids the need to include circuitry in the remote units to perform band-level communications signal construction, thus reducing complexity and component cost of the remote units. However, when the individual communications channels are constructed into a spectrum chunk, channel-level granularity (i.e., the ability to condition individual communications channels) is lost. However, it may be desired to condition the communications channels (e.g., adjust one or more attributes such as frequency, gain level, etc.) on an individual channel-level granularity before distributing the communications channels to the remote units and client devices. Thus, to allow for individual conditioning of individual communications channels before being constructed into spectrums chunks, the central unit also includes channel conditioning circuits. The channel conditioning circuits are configured to individually condition the individual communications channels before being organized into spectrum chunks. In this manner, centralized construction of spectrum chunks provides the benefits of reduced transmission rates and reduced complexity of the remote units not being required to perform band-level communications signal construction, while still allowing for channel-level granularity conditioning.

In one exemplary aspect, a central unit in a digital WDCS is provided. The central unit comprises a plurality of downlink input interfaces each configured to receive a downlink digital communications channel among a plurality of downlink digital communications channels, from a signal source among a plurality of signal sources. The central unit also comprises a plurality of digital up-converter (DUC) circuits each configured to receive a respective downlink communications channel among the plurality of downlink communications channels, interpolate the downlink digital communications channel to a defined sample rate for a target bandwidth of a downlink spectrum chunk of one or more downlink spectrum chunks into an interpolated downlink digital communications channel, and frequency up-shift the interpolated downlink digital communications channel at a defined position in the downlink spectrum chunk of the one or more downlink spectrum chunks. The central unit also comprises a downlink routing circuit configured to receive the interpolated downlink digital communications channels interpolated by the plurality of DUC circuits and route each of the interpolated downlink digital communications channels each corresponding to a downlink spectrum chunk of the one or more downlink spectrum chunks to one or more downlink routing output ports among a plurality of downlink routing output ports based on a downlink routing map. The central unit also comprises at least one data stream (DS) construction circuit configured to combine the one or more downlink spectrum chunks routed to the one or more downlink routing output ports, into one or more downlink spectrum chunk streams. The central unit also comprises at least one downlink output interface coupled to at least one communications medium communicatively coupled to at least one remote unit among a plurality of remote units, the at least one downlink output interface configured to distribute the one or more downlink spectrum chunks to the at least one remote unit.

An additional embodiment of the disclosure relates to a method of distributing spectrum chunks from a central unit in a digital WDCS to a plurality of remote units. The method comprises receiving a plurality of downlink digital communications channels from a plurality of signal sources. The method also comprises interpolating each of the plurality of downlink digital communications channels to a respective defined sample rate for a target bandwidth of a downlink spectrum chunk of one or more downlink spectrum chunks into a respective interpolated downlink digital communications channel. The method also comprises frequency up-shifting each of the interpolated downlink digital communications channels at a defined position in the respective downlink spectrum chunk of the one or more downlink spectrum chunks. The method also comprises routing each of the plurality of interpolated downlink digital communications channels each corresponding to a downlink spectrum chunk of the one or more downlink spectrum chunks to one or more downlink routing output ports among a plurality of downlink routing output ports based on a downlink routing map. The method also comprises combining the one or more downlink spectrum chunks routed to the one or more downlink routing output ports, into one or more downlink spectrum chunk streams. The method also comprises distributing the one or more downlink spectrum chunk streams to at least one remote unit.

An additional embodiment of the disclosure relates to a digital WDCS. The digital WDCS comprises a central unit. The central unit comprises a plurality of downlink input interfaces each configured to receive a downlink digital communications channel among a plurality of downlink digital communications channels, from a signal source among a plurality of signal sources. The central unit also comprises a plurality of DUC circuits each configured to receive a respective downlink digital communications channel among the plurality of downlink digital communications channels, interpolate the downlink digital communications channel to a defined sample rate for a target bandwidth of a downlink spectrum chunk of one or more downlink spectrum chunks into an interpolated downlink digital communications channel, and frequency up-shift the interpolated downlink digital communications channel at a defined position in the downlink spectrum chunk of the one or more downlink spectrum chunks. The central unit also comprises a downlink routing circuit configured to receive the interpolated downlink digital communications channels interpolated by the plurality of DUC circuits and route each of the interpolated downlink digital communications channels each corresponding to a downlink spectrum chunk of the one or more downlink spectrum chunks to one or more downlink routing output ports among a plurality of downlink routing output ports based on a downlink routing map. The central unit also comprises at least one DS construction circuit configured to combine the one or more downlink spectrum chunks routed to the one or more downlink routing output ports, into one or more downlink spectrum chunk streams. The central unit also comprises at least one downlink output interface coupled to at least one communications medium communicatively coupled to at least one remote unit among a plurality of remote units, the at least one downlink output interface configured to distribute the one or more downlink spectrum chunk streams to the at least one remote unit. The at least one remote unit among the plurality of remote units comprises a downlink input interface configured to receive the one or more downlink spectrum chunk streams from the central unit. The at least one remote unit among the plurality of remote units also comprises a downlink DS deconstruction circuit configured to deconstruct the one or more downlink spectrum chunk streams into one or more individual downlink spectrum chunks. The at least one remote unit among the plurality of remote units also comprises a digital-to-analog converter (DAC) circuit configured to convert the one or more individual downlink spectrum chunks into one or more downlink analog spectrum chunks. The at least one remote unit among the plurality of remote units also comprises a frequency upshifter circuit configured to frequency upshift the one or more downlink analog spectrum chunks into one or more downlink analog communications signals having one or more respective frequency bandwidths for one or more respective communications bands. The at least one remote unit among the plurality of remote units also comprises an antenna configured to wirelessly distribute the one or more downlink analog communications signals.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to digital wireless distributed communications systems (WDCS) employing a centralized spectrum chunk construction of communications channels for distribution to remote units. A spectrum chunk is a representation of grouped communications channels within a range of frequencies where the bandwidth of the spectrum chunk is equal to or greater than the aggregated bandwidths of the individual communications channels. In aspects disclosed herein, individual, discrete communications channels received from one or more signal sources are centrally constructed into spectrum chunks before being distributed to remote units. When the communications channels are constructed into spectrum chunks, the individual communications channels are positioned in their respective defined center radio frequency (RF) frequencies of their respective communications band before being distributed to the remote units. Thus, the remote units do not have to include the additional cost and associated power consumption of processing circuitry to construct the communications bands for individual communications channels. The remote units can up-convert the received spectrum chunks, which have already been centrally band constructed, to their respective frequencies according to their communication band(s). Further, by providing centralized spectrum chunk construction of communications channels for distribution to remote units, the entire frequency bandwidth of a communications band does not have to be distributed to remote units, wherein portions of the frequency bandwidth may not include communications channels, but still consumes available transmission data rate. Thus, by centrally constructing spectrum chunks of communications channels to be distributed to remote units, transmission data rates can be reduced over transmitting the entire bandwidth of the communications band to the remote units for distributing the communications channels.

Figure 1:
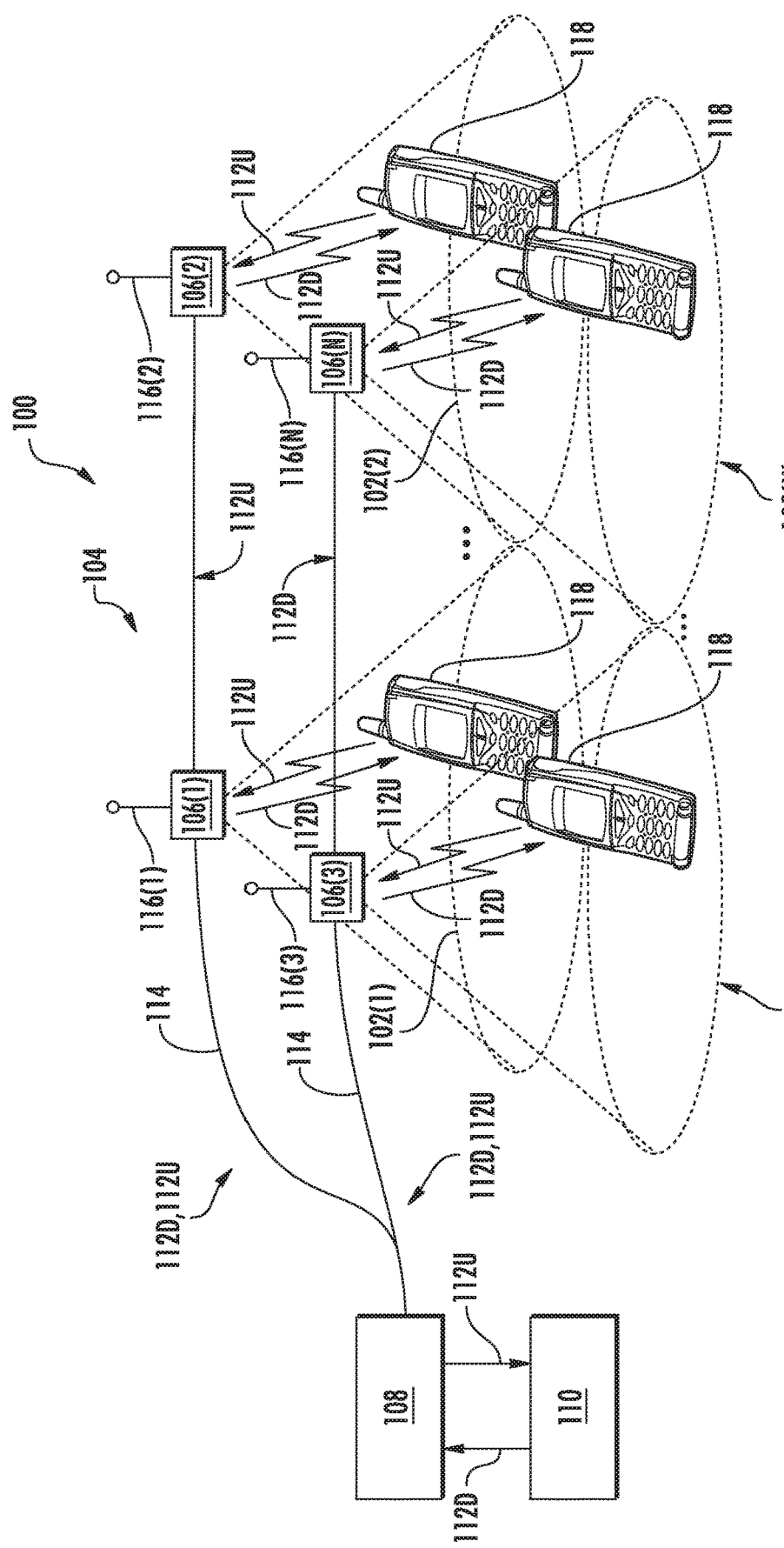
FIG. 1 is a schematic diagram of an exemplary wireless distributed communications system (WDCS) in the form of a distributed antenna system (DAS)
Figure 2:
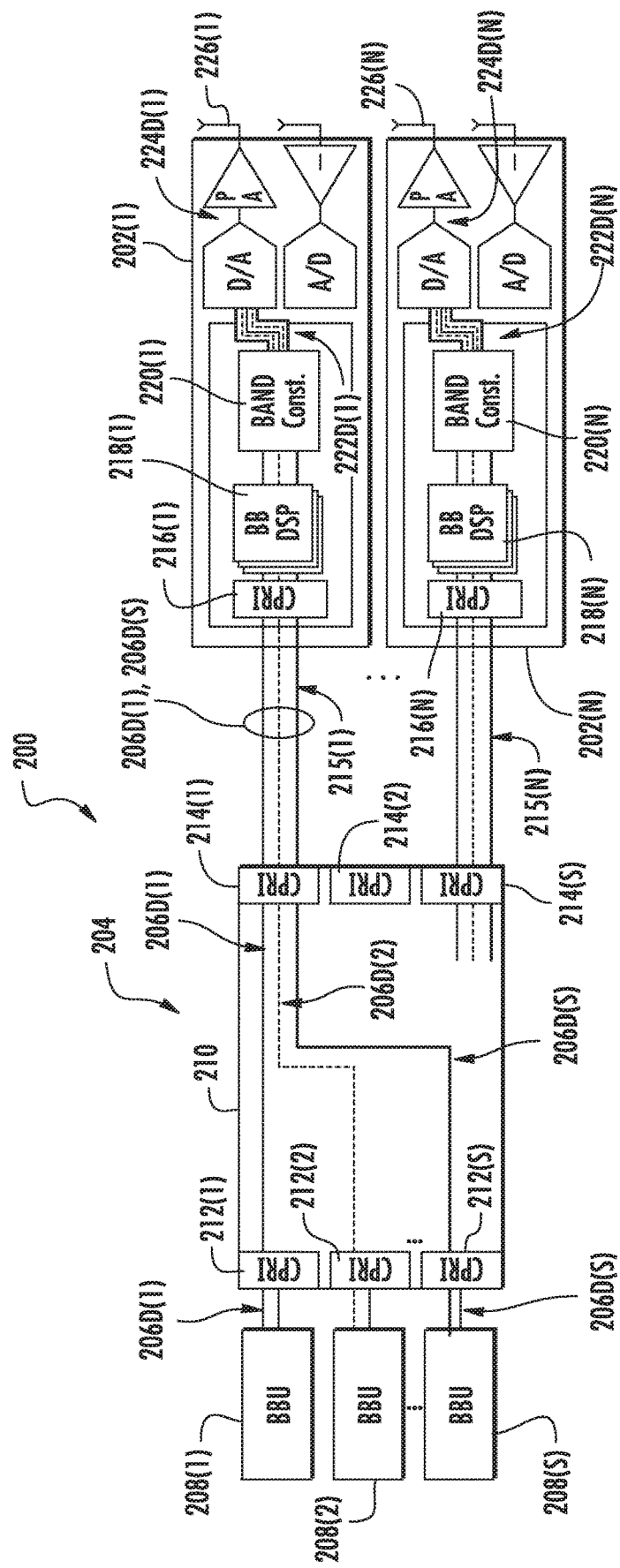
FIG. 2 is a schematic diagram of an exemplary digital WDCS configured to distribute digital communications channels to remote units, wherein the remote units are configured to perform band-level construction of received digital communications channels into band-level communications signals to be distributed to client devices.
Figure 3:
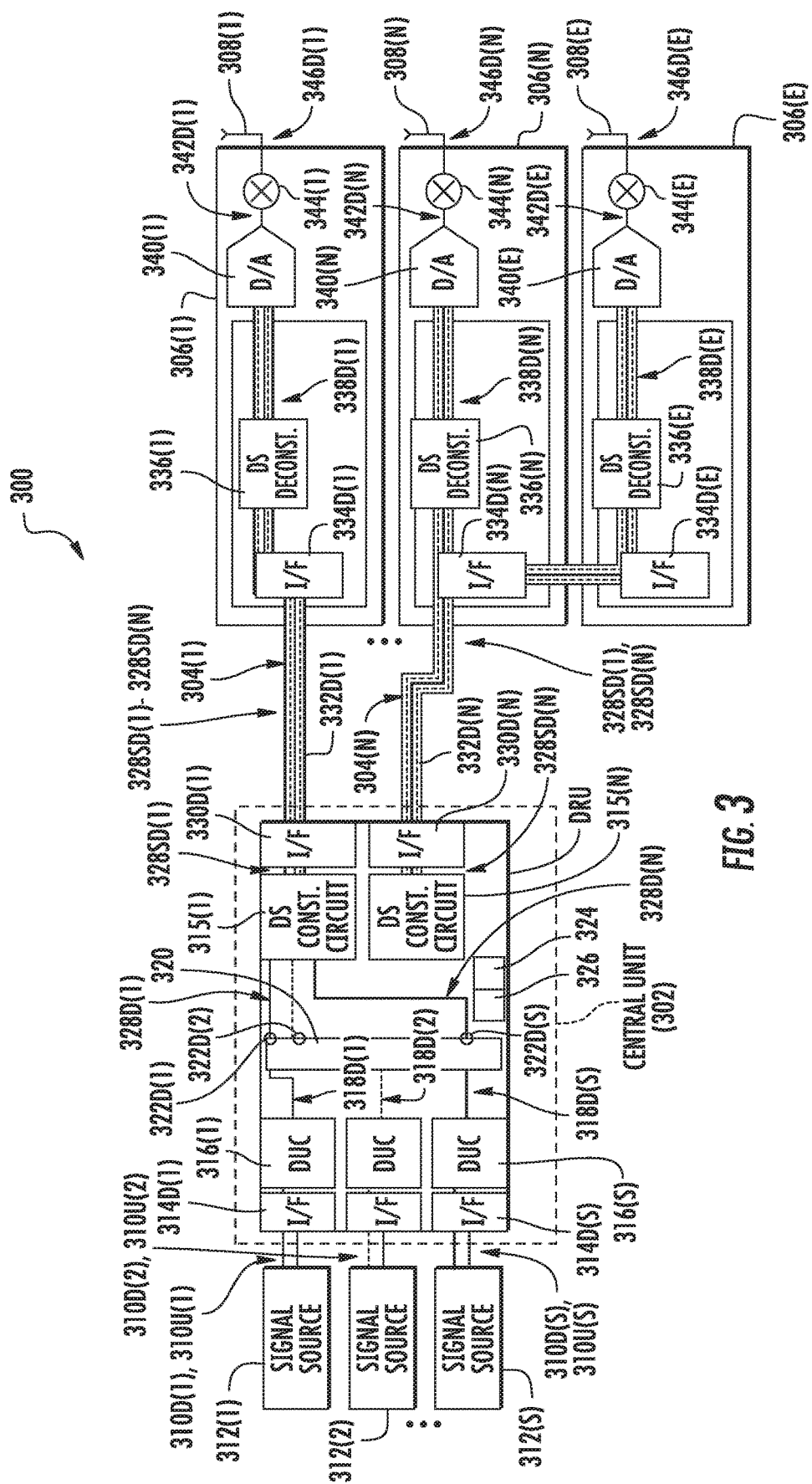
FIG. 3 is a schematic diagram of an exemplary digital WDCS employing centralized spectrum chunk construction for construction of spectrum chunks from individually received digital communications channels for distribution to remote units.

Before discussing examples of embodiments relating to a digital WDCS employing a centralized spectrum chunk construction of communications channels for distribution to remote units starting at FIG. 3, FIG. 2 is first discussed.

FIG. 2 illustrates an exemplary digital WDCS 200 configured to distribute digital signal communications channels ("communications channels") to remote units 202(1)-202(N). The remote units 202(1)-202(N) are configured to perform band-level construction of received digital communications channels into band-level communications signals to be distributed to client devices. In this regard, the digital WDCS 200 includes a central unit 204. The central unit 204 may be a head-end unit or head-end equipment. The central unit 204 is configured to receive individual downlink digital communications channels 206D(l)-206D(S) from a plurality of signal sources 208(1)-208(S) for one or more communications bands relating to one or more communications services. The signal sources 208(1)-208(S) are digital signal sources in the form of baseband units (BBUs) that provide downlink digital baseband communications channels as the downlink digital communications channels 206D(1)-206D (S) in this example. The central unit 204 is configured to receive the downlink digital communications channels 206D (1)-206D(S) in a digital routing unit (DRU) 210 through a respective downlink input interface 212(1)-212(S). The downlink input interfaces 212(1)-212(S) may be configured to receive downlink digital communications channels 206D (1)-206D(S) according to a defined communications protocol, such as common public radio interface (CPRI) protocol for example. The DRU 210 is configured to route the downlink digital communications channels 206D(1)-206D (S) to one or more downlink output interfaces 214(1)-214(S) to be distributed over downlink communications medium 215(1)-215(N) to the remote units 202(1)-202(N). In this example, the DRU 210 is configured to route all received downlink digital communications channels 206D(1)-206D (S) to the remote units 202(1), 202(N) to achieve "channel-level granularity." Thus, only the transmission data rate needed to communicate the downlink digital communications channels 206D(1)-206D(S) to the remote units 202(1), 202(N) is consumed on the downlink communications medium 215(1), 215(N).

With continuing reference to FIG. 2, using remote unit 202(1) as an example, the remote unit 202(1) is configured to receive the individual, discrete downlink digital communications channels 206D(1)-206D(S) through a downlink input interface 216(1) and digitally process the downlink digital communications channels 206D(1)-206D(S) in a digital processing circuit 218(1). For example, the digital processing circuit 218(1) as well as the other digital processing circuits 218(2)-218(N) in the remote units 202(1)-202(N) include digital up-converter circuits (DUCs) (not shown) that are configured to receive and frequency up-shift the received downlink digital communications channels 206D(1)-206D(S) relative to each other at defined frequencies for band construction. The remote units 202(1)-202(N) also each include a band construction circuit 220(1)-220(N) that is configured to position and separate the individual downlink digital communications channels 206D(1)-206D (S) into a downlink digital communications signal 222D(1) according to the respective center frequencies of the downlink digital communications channels 206D(1)-206D(S). Thus, when the downlink digital communications signal 222D(1) is converted to a downlink analog communications signal 224D(1) to be transmitted wirelessly, the information of the individual downlink digital communications channels 206D(1)-206D(S) is provided in the correct center frequencies across the bandwidth of the communications band(s) for the downlink digital communications channels 206D(1)-206D(S). The downlink analog communications signal 224D(1) is transmitted over an antenna 226(1).

Thus, providing the band construction circuits 220(1)-220 (N) in the individual remote units 202(1)-202(N) in the digital WDCS 200 in FIG. 2 has the advantage of limiting the transmission data rate to the bandwidth required for transmission of the downlink digital communications channels 206D(1)-206D(S). However, the digital WDCS 200 also has the disadvantage of each of the remote units including band construction circuits 220(1)-220(N) as additional cost, area, and/or complexity. Further, the digital processing circuits 218(1)-218(N) are required to include DUCs to up-convert each of the downlink digital communications channels 206D(1)-206D(S), which consume power in the remote units 202(1)-202(N) and also add cost. It may be desired to reduce processing power in remote units 202(1)-202(N) by grouping discrete communications channels into spectrum chunks at the central unit 204 and distributing as spectrum chunks to the remote units 202(1)-202(N), while still keeping the ability to individually control the properties of each of the communications channels separately as occur in the case of distributing of discrete channels ("channel-level granularity").

In this regard, FIG. 3 is schematic diagram of an exemplary digital WDCS 300 employing centralized spectrum chunk construction for construction of spectrum chunks from individually received digital communications channels for distribution to remote units. The downlink path of the digital WDCS 300 is shown in FIG. 3. In this regard, the digital WDCS 300 includes a central unit 302. The central unit 302 may be a head-end unit and/or may include head-end equipment. The central unit 302 is configured to distribute digital communications signals 310(1)-310(N) as downlink spectrum chunks to a plurality of remote units 306(1)-306(N) to then be transmitted wirelessly over respective antennas 308(1)-308(N) to client devices (not shown). The digital communications signals 310(1)-310(N) may be digital RF communications signals 310(1)-310(N). The central unit 302 is configured to receive individual, discrete downlink digital communications channels 310D(1)-310D(S) for one or more communications services having a respective frequency bandwidth from a plurality of signal sources 312(1)-312(S) through respective downlink input interfaces 314D(1)-314D(S). Note that the downlink input interfaces 314D(1)-314D(S) may provide interfaces for both received downlink digital communications channels 310D(1)-310D(S) and uplink digital communications channels 310U(1)-310U(S) communicated from the central unit 302 to the signal sources 312(1)-312(S). The signal sources 312(1)-312(S) could be digital signal sources, such as baseband units (BBUs) that communicate the digital communications channels (e.g., in baseband) to the central unit 302. The downlink digital communications channels 310D(1)-310D(S) may relate to the same communications services or to multiple communications services. The downlink digital communications channels 310D(1)-310D(S) may be communicated according to a designated protocol, such as CPRI for example. Alternatively or in addition, the signal sources 312(1)-312(S) could be analog signal sources, including analog RF signal sources, that communicate downlink analog communications channels to the central unit 302, which are then converted into the downlink digital communications channels 310D(1)-310D(S).

With continuing reference to FIG. 3, in aspects disclosed herein that will be discussed in more detail below, to avoid the need to provide band construction circuits in the remote units 306(1)-306(N), the central unit 302 includes digital up-converter (DUC) circuits 316(1)-316(S). The DUC circuits 316(1)-316(S) are configured to construct a frequency bandwidth for the communications band that include the downlink digital communications channels 310D(1)-310D(S) for the respective communications band into one or more downlink spectrum chunks 328D(1)-328D(N). As will be discussed in more detail below, when the downlink digital communications channels 310D(1)-310D(S) are constructed into the one or more downlink spectrum chunks 328D(1)-328D(N), the individual downlink digital communications channels 310D(1)-310D(S) are positioned in their respective defined center frequencies of their respective communications band before being distributed to the remote units 306(1)-306(N). Thus, the remote units 306(1)-306(N) do not have to include the additional cost and associated power consumption of processing circuitry to construct the communications bands for individual downlink digital communications channels 310D(1)-310D(S). The remote units 306(1)-306(N) can up-convert the received downlink spectrum chunks 328D(1)-328D(N), which have already been centrally constructed, to their respective frequencies according to their communication band(s).

Further, in this example, the downlink spectrum chunks 328D(1)-328D(N) may have a bandwidth that is a subset of or reduced bandwidth of the represented communications band and that include the downlink digital communications channels 310D(1)-310D(S) for the represented communications bands to be distributed to the remote units 306(1)-306(N) for distribution to client devices. In this manner, it is not necessary for the central unit 302 to communicate the entire frequency bandwidth of the communications bands to the remote units 306(1)-306(N) wherein portions of the frequency bandwidth of the communications band may be unused, but yet still consume available data transmission rate. Thus, data transmission rates can be reduced in the digital WDCS 300 for communicating the downlink digital communications channels 310D(1)-310D(S) while avoiding the requirement to provide band construction circuits in the individual remote units 306(1)-306(N). In other examples, the downlink spectrum chunks 328D(1)-328D(N) may cover the entire bandwidth or substantially the entire bandwidth of the represented communications band(s) where most or all of the communications channels are in use.

Figure 4:
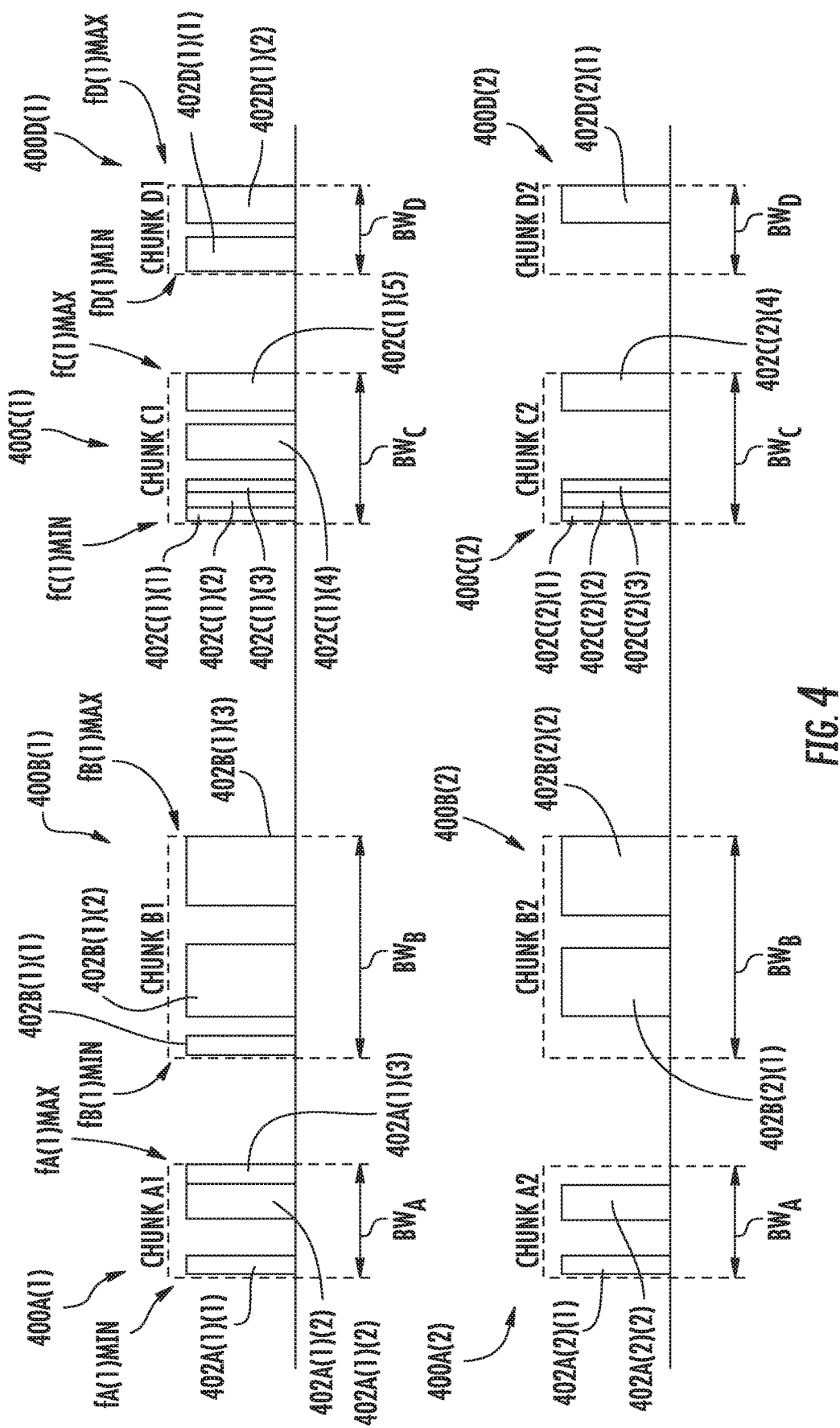
FIG. 4 illustrates examples of constructing individual communications channels for a communications service having a frequency bandwidth into digital spectrum chunks of reduced bandwidth.

For example, FIG. 4 illustrates examples of individual digital communications channels constructed into spectrum chunks. For example, as shown in FIG. 4, spectrum chunk A1 400A(1) includes three (3) communications channels 402A(1)(1)-402A(1)(3) that are positioned in their respective defined center frequencies for communications band 'A' in a bandwidth $BW_A$ between minimum and maximum frequencies $fA(1)_{MIN}$, $fA(1)_{MAX}$ before being distributed to the remote units 306(1)-306(N) in FIG. 3. Spectrum chunk B1 400B(1) includes three (3) communications channels 402B(1)(1)-402B(1)(3) that are positioned in their respective defined center frequencies for communications band 'B' each in a bandwidth $BW_B$ between minimum and maximum frequencies $fB(1)_{MIN}$, $fB(1)_{MAX}$ before being distributed to the remote units 306(1)-306(N) in FIG. 3. Spectrum chunk C1 400C(1) includes five (5) communications channels 402C(1)(1)-402C(1)(5) that are positioned in their respective defined center frequencies for communications band 'C' each in a bandwidth $BW_C$ between minimum and maximum frequencies $fC(1)_{MIN}$, $fC(1)_{MAX}$ before being distributed to the remote units 306(1)-306(N) in FIG. 3. Spectrum chunk D1 400D(1) includes two (2) communications channels 402D(1)(1), 402D(1)(2) that are positioned in their respective defined center frequencies for communications band 'D' each in a bandwidth $BW_D$ between minimum and maximum frequencies $fD(1)_{MIN}$, $fD(1)_{MAX}$ before being distributed to the remote units 306(1)-306(N) in FIG. 3. Any number of spectrum chunks A1, A2, B1, B2, C1, C2, D1, D2 can be combined or merged into a spectrum chunk stream. Once a specific spectrum chunk, such as spectrum chunks A1, B1, C1, D1 for communications bands 'A', 'B', 'C', 'D', have been defined in terms of their minimum and maximum frequencies, other variations of these spectrum chunks can be constructed.

For example, with continuing reference to FIG. 4, spectrum chunk A2 400A(2) includes two (2) communications channels 402A(2)(1), 402A(2)(2) that are positioned in their respective defined center frequencies for communications band 'A' in the bandwidth $BW_A$. Spectrum chunk B2 400B(2) includes two (2) communications channels 402B(2)(1), 402B(2)(2) that are positioned in their respective defined center frequencies for communications band 'B' each in the bandwidth $BW_B$. Spectrum chunk C2 400C(2) includes four (4) communications channels 402C(2)(1)-402C(2)(4) that are positioned in their respective defined center frequencies for communications band 'C' each in the bandwidth $BW_C$.

Spectrum chunk D2 400D(2) includes one (1) communications channel 402D(2)(1) that is positioned in its respective defined center frequency for communications band 'D' in the bandwidth $BW_D$.

Turning back to FIG. 3, further exemplary explanation of constructing individual digital communications channels for communications bands having respective frequency bandwidths into multiple spectrum chunks of reduced bandwidth is now described. The central unit 302 in the digital WDCS 300 includes the plurality of downlink input interfaces 314D(1)-314D(S) each configured to receive the downlink digital communications channels 310D(1)-310D(S) from the signal sources 312(1)-312(S). The central unit 302 includes a plurality of DUC circuits 316(1)-316(S) each configured to receive and frequency up-shift a respective downlink digital communications channel 310D among the plurality of downlink digital communications channels 310D(1)-310D(S) into interpolated downlink digital communications channels 318D(1)-318D(S) at a defined frequency channel band for at least one downlink spectrum chunk. The DUC circuits 316(1)-316(S) are set up and/or controlled to provide the desired frequency up-shifting of the downlink digital communications channels 310D(1)-310D(S) to arrange the downlink digital communications channels 310D(1)-310D(S) according to the desired groupings for constructing the downlink spectrum chunks 328D(1)-328D(N). For example, as discussed above with regard to FIG. 4, the frequency up-shifting of the downlink digital communications channels 310D(1)-310D(S) may be performed to shift the downlink digital communications channels 310D(1)-310D(S) into a bandwidth based on the minimum and maximum frequency of the downlink digital communications channels 310D(1)-310D(S).

With continuing reference to FIG. 3, a downlink routing circuit 320 is provided that is configured to receive and route the interpolated downlink digital communications channels 318D(1)-318D(S) to one or more downlink routing output ports 322D(1)-322D(S) based on a downlink routing map 324. A control circuit 326 may be provided in the central unit 302 that is configured to access the downlink routing map 324, which may be stored in a memory, and configure the downlink routing circuit 320 to provide the desired routing of the interpolated downlink digital communications channels 318D(1)-318D(S). The routing of the interpolated downlink digital communications channels 318D(1)-318D(S) will control which remote units 306(1)-306(N) receive the interpolated downlink digital communications channels 318D(1)-318D(S) as part of downlink spectrum chunks 328D(1)-328D(N). For example, two or more of the interpolated downlink digital communications channels 318D(1)-318D(S) could be combined to form one or more downlink spectrum chunks 328D(1)-328D(N). The downlink spectrum chunks 328D(1)-328D(N) are provided to data stream (DS) construction circuits 315(1)-315(N) according to the routing by the downlink routing circuit 320. The DS construction circuits 315(1)-315(N) are each configured to merge the downlink spectrum chunks 328D(1)-328D(N) into one or more respective downlink spectrum chunk streams 328SD(1)-328SD(N) according to a desired communications protocol, such as CPRI for example. Downlink output interfaces 330D(1)-330D(N) are provided that are coupled to one or more respective downlink communications medium 332D(1)-332D(N) that are communicatively coupled to the remote units 306(1)-306(N) to distribute the one or more downlink spectrum chunk streams 328SD(1)-328SD(N) to the remote unit 306(1)-306(N). Thus, the downlink spectrum chunk streams 328SD(1)-328SD(N) received by the remote units 306(1)-306(N) are controlled by the routing of the downlink spectrum chunks 328D(1)-328D(N) to the respective DS construction circuits 315(1)-315(N).

Figure 5:
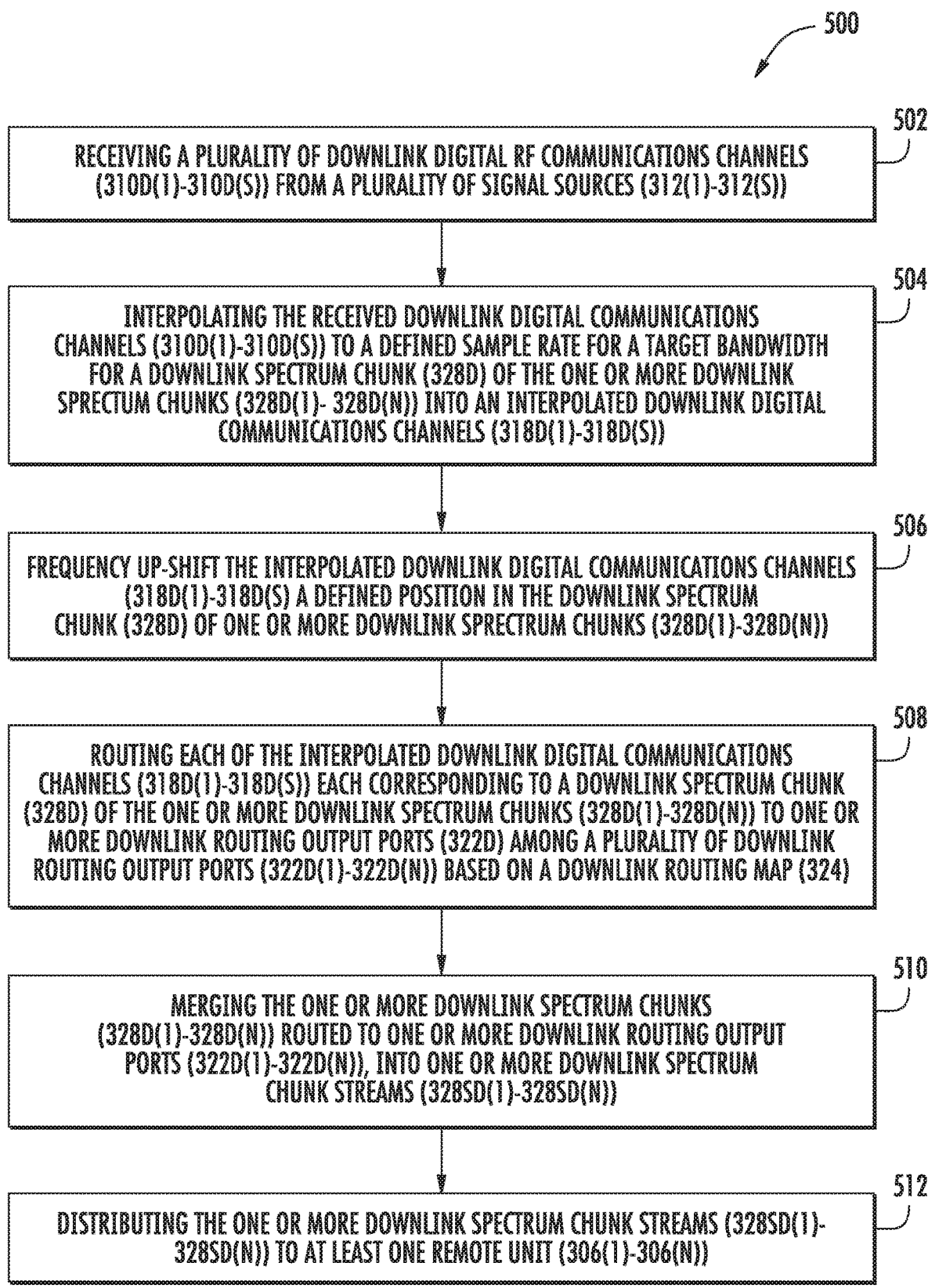
FIG. 5 is a flowchart illustrating an exemplary process of the digital WDCS in FIG. 3 constructing spectrum chunks from individually received downlink digital communications channels for distribution to the remote units.

To further explain the downlink operation of the central unit 302 in FIG. 3, FIG. 5 is a flowchart illustrating an exemplary process 500 of the digital WDCS 300 in FIG. 3 constructing spectrum chunks from individually received downlink digital communications channels 310D(1)-310D(S) for distribution to the remote units 306(1)-306(N). The process 500 includes the central unit 302 in the digital WDCS 300 in FIG. 3 receiving the downlink digital communications channels 310D(1)-310D(S) from the signal sources 312(1)-312(S) over the downlink input interfaces 314D(1)-314D(S) (block 502). The process 500 also includes the DUC circuits 316(1)-316(S) interpolating the downlink digital communications channels 310D(1)-310D(S) to a defined sample rate for a target bandwidth for a downlink spectrum chunk 328D of one or more downlink spectrum chunks 328D(1)-328D(N), into a respective interpolated downlink digital communications channel 318D(1)-318D(S) (block 504). The process also includes frequency up-shifting the interpolated downlink digital communications channels 318D(1)-318D(S) into a defined position in a downlink spectrum chunks 328D of the one or more downlink spectrum chunks 328D(1)-328D(N) (block 506). The process also includes the downlink routing circuit 320 routing each of the interpolated downlink digital communications channels 318D(1)-318D(S) each corresponding to a downlink spectrum chunk 328D of the one or more downlink spectrum chunks 328D(1)-328D(N) to one or more downlink routing output ports 322D among a plurality of downlink routing output ports 322D(1)-322D(S) based on a downlink routing map 324 (block 508). The process 500 also includes the DS construction circuits 315(1)-315(N) merging one or more of the downlink spectrum chunks 328D(1)-328D(S) routed to at least one downlink routing output ports 322D(1)-322D(S), into one or more downlink spectrum chunk streams 328SD(1)-328SD(N) (block 510). The process 500 also involves distributing the one or more downlink spectrum chunk streams 328SD(1)-328SD(N) to at least one remote unit 306(1)-306(N) (block 512).

With reference back to FIG. 3, the remote units 306(1)-306(N) are shown as receiving the downlink spectrum chunk streams 328SD(1)-328SD(N) in this example. In this example, the remote units 306(1)-306(N) each include a respective downlink input interface 334D(1)-334D(N) configured to receive the one or more downlink spectrum chunk streams 328SD(1)-328SD(N) from the central unit 302. For example, the downlink input interfaces 334D(1)-334D(N) may be configured to receive the downlink spectrum chunk streams 328SD(1)-328SD(N) according to a defined communications protocol, such as CPRI protocol for example. The downlink spectrum chunk streams 328SD(1)-328SD(N) received by the remote units 306(1)-306(N) are provided to their respective DS deconstruction circuits 336(1)-336(N), which are to separate or unmerge the one or more downlink spectrum chunk streams 328SD(1)-328SD(N) into one or more individual downlink spectrum chunks 338D(1)-338D(N). Digital-to-analog converter (DAC) circuits 340(1)-340(N) are provided to convert the individual downlink spectrum chunks 338D(1)-338D(N) into one or more individual downlink analog spectrum chunks 342D(1)-342D(N). A frequency upshifter circuit 344(1)-344(N) frequency upshifts the one or more individual downlink analog spectrum chunks 342D(1)-342D(N) into one or more corresponding downlink analog communications signals 346D (1)-346D(N) in respective frequency bandwidths for one or more respective communications bands to be distributed wirelessly by the antennas 308(1)-308(N).

Note that as also shown in FIG. 3, an extension remote unit 306(E) may be provided that is directly coupled to another remote unit 306, which in this example is remote unit 306(N). In this manner, a downlink input interface 334D(E) of the extension remote unit 306(E) can be coupled to the downlink input interface 334D(N) of the remote unit 306(N) to receive the downlink spectrum chunk streams 328SD(1)-328SD(N) received by the remote unit 306(N). The downlink spectrum chunk streams 328SD(1)-328SD(N) received by the extension remote unit 306(E) are provided to a DS deconstruction circuit 336(E) to separate or unmerge the one or more downlink spectrum chunk streams 328SD(1)-328SD(N) into one or more individual downlink spectrum chunks shown as downlink spectrum chunk 338D(E). A DAC circuit 340(E) is provided to convert the downlink spectrum chunk 338D(E) into one or more downlink analog spectrum chunks 342D(E). A frequency upshifter circuit 344(E) frequency upshifts the one or more individual downlink analog spectrum chunks 342D(E) into one or more corresponding downlink analog communications signals 346D(E) in respective frequency bandwidths for one or more respective communications bands to be distributed wirelessly by the antenna 308(E).

Note that if any of the signal sources 312(1)-312(S) were analog signal sources, the respective downlink input interface 314D(1)-314D(S) in the central unit 302 could be configured to receive downlink analog communications channels from the respective signal source 312(1)-312(S). In this case, the central unit 302 could include analog-to-digital converter (ADC) circuits to convert the received analog communications channels to digital communications channels to then be processed as described above. Also note that only the downlink communications paths and related downlink components are shown in the central unit 302 and the remote units 306(1)-306(N), 306(E). However, the uplink communications paths and related uplink components in the central unit 302 and the remote units 306(1)-306(N), 306(E) can also be configured to support construction and distribution of uplink spectrum chunks as uplink spectrum chunk streams from the remote units 306(1)-306(N), 306(E) to the central unit 302 to convey uplink communications channels over the downlink communications medium 332D(1)-332D(N), or separate uplink communications medium if the downlink communications medium 332D(1)-332D(N) are dedicated to support distribution of the downlink spectrum chunk streams 328SD(1)-328SD(N).

It also may be desired to condition the downlink digital communications channels in a central unit in a WDCS before constructing the downlink spectrum chunks to be distributed to the remote units. Since the downlink digital communications channels are present in the central unit, the individual downlink digital communications channels can be conditioned. For example, it may be desired to adjust certain attributes of the downlink digital communications channels, such as the signal level, equalization, and time delay as non-limiting examples.

Figure 6A:
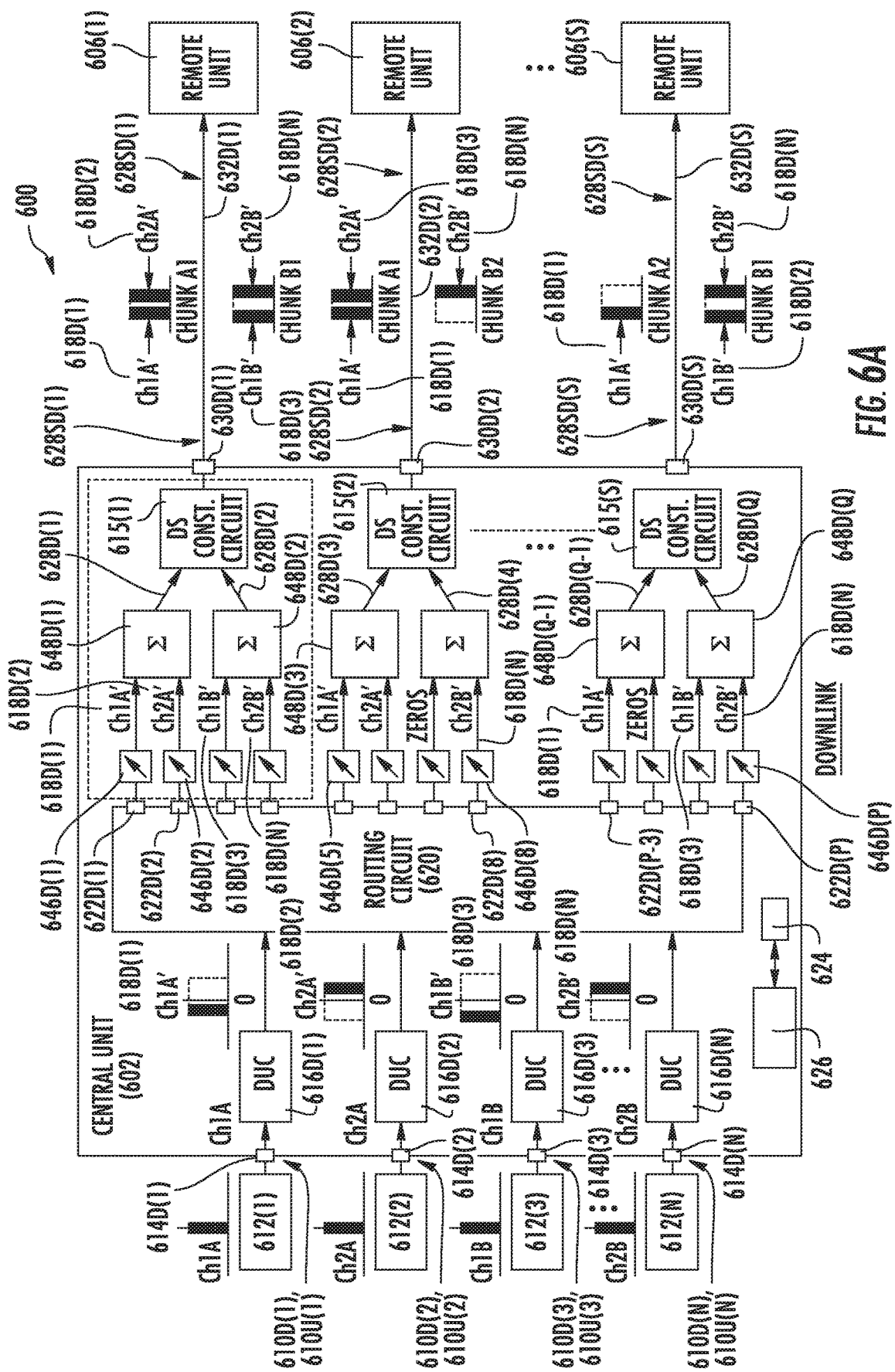
FIG. 6A is a schematic diagram of an exemplary central unit that can be employed in the digital WDCS, wherein the central unit constructs downlink spectrum chunks from individually received downlink communications channels for distribution to remote units.
Figure 6B:
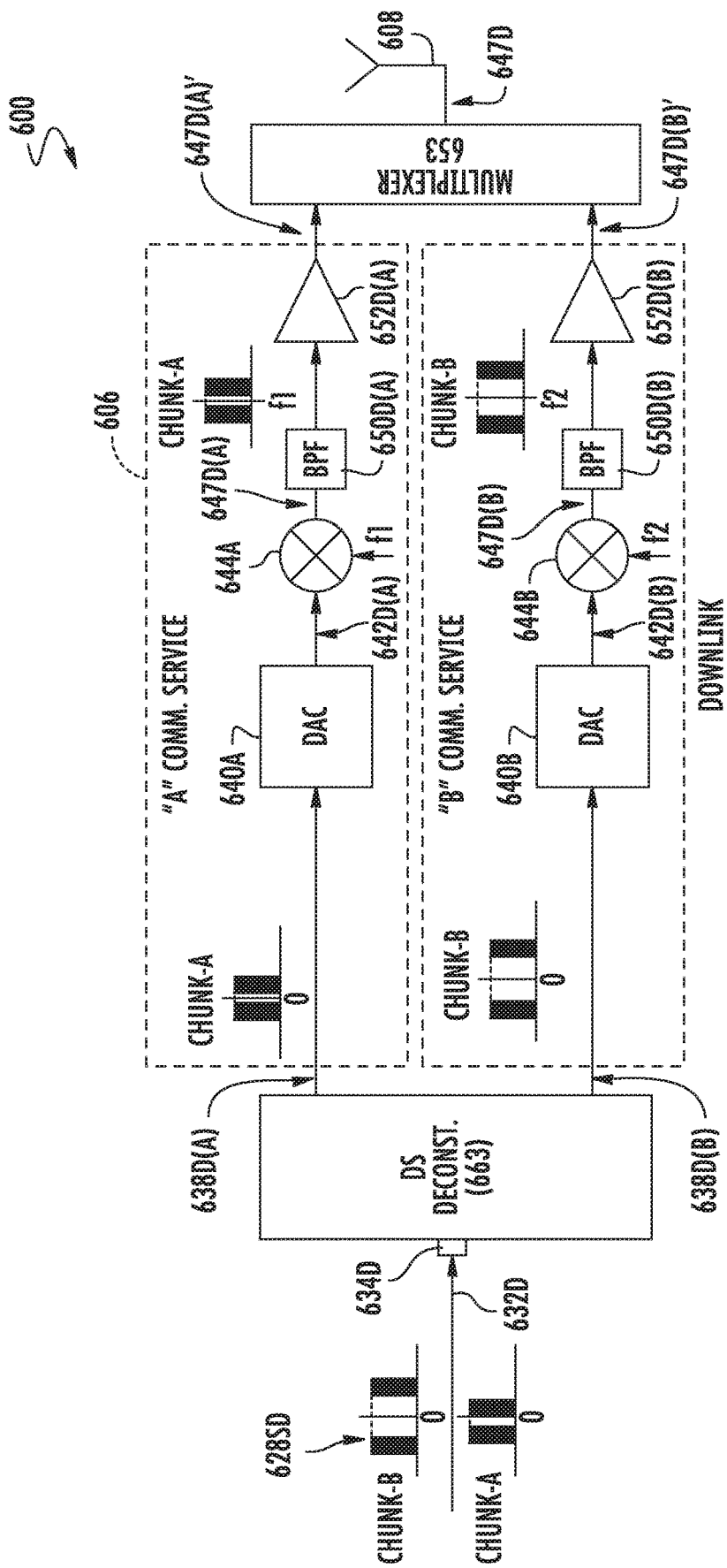
FIG. 6B is a schematic diagram of an exemplary remote unit that can be employed in the WDCS and receiving the downlink spectrum chunks from the central unit as illustrated in FIG. 6A and process the downlink spectrum chunks to be transmitted as downlink analog communications signals to client devices.
Figure 7A:
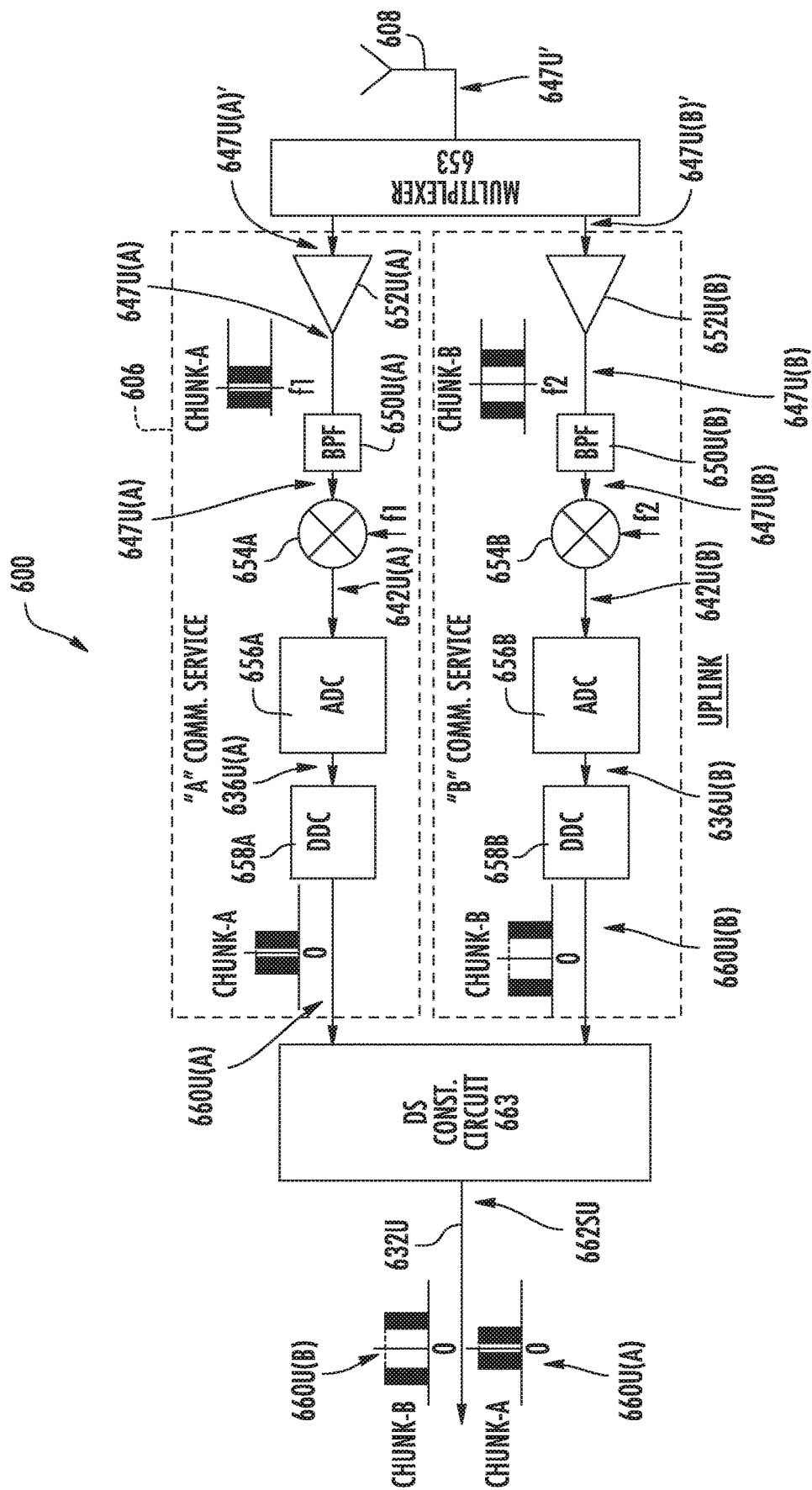
FIG. 7A is a schematic diagram of the remote unit as illustrated in FIG. 6B receiving uplink analog communications signals from client devices and converting the uplink analog communications signals into uplink spectrum chunks to be distributed to the central unit in FIG. 6A.
Figure 7B:
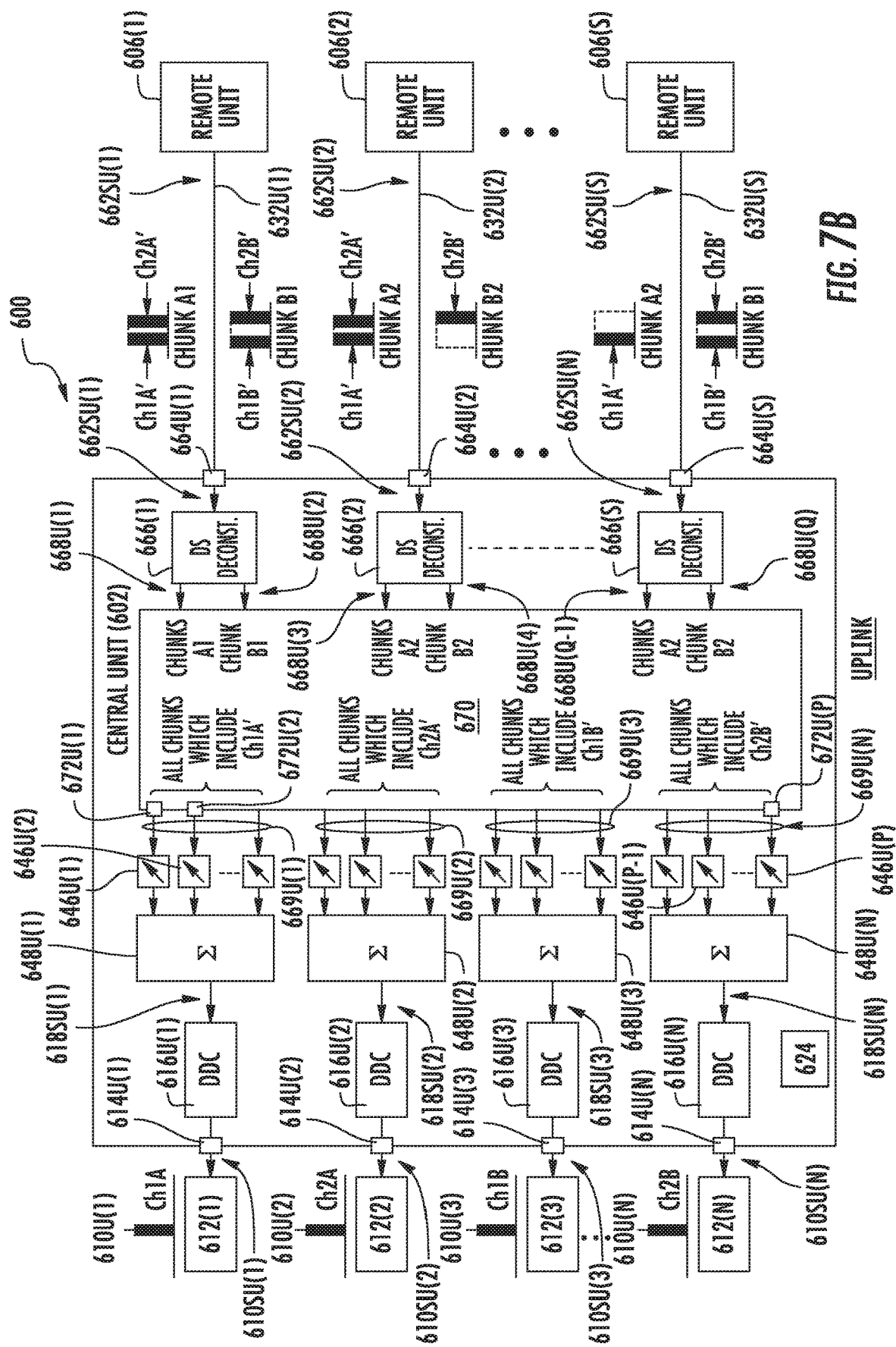
FIG. 7B is a schematic diagram of the central unit as illustrated in FIG. 6A receiving the uplink spectrum chunks from the remote unit as illustrated in FIG. 6B and routing the uplink spectrum chunks to signal sources.

In this regard, FIGS. 6A-7B are schematic diagrams of an exemplary digital WDCS 600 employing spectrum chunk construction for construction of spectrum chunks from individually received communications channels for distribution to remote units. FIG. 6A is a schematic diagram of downlink paths in an exemplary central unit 602 in the digital WDCS 600, wherein the central unit 602 is configured to construct downlink spectrum chunks 628D(1)-628D(Q) from individually received downlink digital communications channels 610D(1)-610D(N) for communication bands 'A' and 'B' for distribution to remote units 606(1)-606(S). The downlink digital communications channels 610D(1)-610D(N) may be radio-frequency (RF) communications channels. FIG. 6B is a schematic diagram of downlink paths of an exemplary remote unit 606 in the digital WDCS 600 configured to receive the downlink spectrum chunks 628D(1)-628D(Q) for communications bands 'A' and 'B' from the central unit 602 as illustrated in FIG. 6A and process the downlink spectrum chunks 628D(1)-628D(Q) to be transmitted as downlink analog communications signals 647D to client devices. FIG. 7A is a schematic diagram of uplink paths in the remote unit 606 as illustrated in FIG. 6B receiving uplink analog communications signals 647U(A)', 647U(B)' from client devices for communications bands 'A' and 'B' and converting the uplink analog communications signals 647U(A)', 647U(B)' into uplink spectrum chunk streams 662SU(1)-662SU(S) to be distributed to the central unit 602 as illustrated in FIG. 6A. FIG. 7B is a schematic diagram of uplink paths in the central unit 602 in FIG. 6A receiving the uplink spectrum chunks 662U(1)-662U(N) from the remote unit 606 as illustrated in FIG. 7A and routing the uplink spectrum chunks 662U(1)-662U(N) to signal sources 612(1)-612(N). FIGS. 6A-7B will now be described in more detail.

With reference to FIG. 6A, the central unit 602 may be a head-end unit and/or may include head-end equipment. The central unit 602 is configured to distribute discrete downlink digital communications channels 610D(1)-610D(N) to the remote units 606(1)-606(S) to then be transmitted wirelessly over respective antennas 608(1)-608(N) to client devices. The central unit 602 is configured to receive the individual, discrete downlink digital communications channels 610D(1)-610D(N) for one or more communications bands having a respective frequency bandwidth from the signal sources 612(1)-612(N) through respective downlink input interfaces 614D(1)-614D(N). Note that the downlink input interfaces 614D(1)-614D(N) may provide interfaces for both received downlink digital communications channels 610D(1)-610D(N) and frequency down-shifted uplink digital communications channels 610U(1)-610U(N) communicated back from the remote units 606(1)-606(S) through the central unit 602 to the signal sources 612(1)-612(N). The signal sources 612(1)-612(N) could be digital signal sources, such as baseband units (BBUs) that communicate the digital communications channels (e.g., in baseband) to the central unit 602. The downlink digital communications channels 610D(1)-610D(N) may be communicated according to a designated protocol, such as CPRI for example. The downlink digital communication channels 610D(1)-610D(N) may relate to the same communications services or to multiple communications services. For example, as shown in FIG. 6A, downlink digital communications channels 610D(1), 610D(2), also labeled Ch1A and Ch2A, respectively, are a first and second channel for a first communications band 'A' that has a designated first full bandwidth. Downlink digital communications channels 610D(3), 610D(N), also labeled Ch1B and Ch2B, respectively, are a first and second channel for a second communications band 'B' that has a designated second full bandwidth that may not overlap the bandwidth of communications band 'A'.

With continuing reference to FIG. 6A, the central unit 602 in the digital WDCS 600 includes a plurality of digital up-converter (DUC) circuits 616D(1)-616D(N) each configured to receive and frequency up-shift a respective downlink digital communications channel 610D among the plurality of downlink digital communications channels 610D(1)-610D(N) into interpolated downlink digital communications channels 618D(1)-618D(N) at a defined frequency channel band for a downlink spectrum chunk. The DUC circuits 616D(1)-616D(N) are set up and/or controlled to provide the desired frequency up-shifting of the downlink digital communications channels 610D(1)-610D(N) to arrange the downlink digital communications channels 610D(1)-610D(N) according to the desired groupings for constructing downlink spectrum chunks. A control circuit 626 is provided that can be configured to control the frequency up-shifting by the DUC circuits 616D(1)-616D(N) on a respective downlink digital communications channel 610D(1)-610D(N). For example, as shown in FIG. 6A, DUC circuits 616D(1), 616D(2) are a first set of DUC circuits that frequency up-shift the first set of downlink digital communications channels 610D(1), 610D(2) corresponding to the first communications band 'A', into a first set of interpolated downlink digital communications channels 618D(1), 618D(2). In this manner, the interpolated downlink digital communications channels 618D(1), 618D(2) can be frequency shifted to be positioned in the desired bandwidth so that when downlink spectrum chunks 628D(1)-628D(Q) are constructed from the interpolated downlink digital communications channels 618D(1), 618D(2), these interpolated downlink digital communications channels 618D(1), 618D(2) are arranged with respect to each other as desired, in a downlink spectrum chunk 628D(1)-628D(Q). Similarly, DUC circuits 616D(3), 616D(N) are a second set of DUC circuits that frequency up-shift a second set of downlink communications channels 610D(3), 610D(N) corresponding to the second communications band 'B', into a second set of interpolated downlink digital communications channels 618D(3), 618D(N). The interpolated downlink digital communications channels 618D(3), 618D(N) are also frequency shifted to be positioned in the desired bandwidth for eventual position in a downlink spectrum chunk(s) 628D(1)-628D(Q).

With continuing reference to FIG. 6A, a downlink routing circuit 620 is provided that is configured to receive and route the interpolated downlink digital communications channels 618D(1)-618D(N) to one or more downlink routing output ports 622D(1)-622D(P) based on a routing map 624. The control circuit 626 may be provided in or coupled to the central unit 602 that is configured to access the routing map 624, which may be stored in a memory, and configures the downlink routing circuit 620 to provide the desired routing of the interpolated downlink digital communications channels 618D(1)-618D(N). The routing of the interpolated downlink digital communications channels 618D(1)-618D(N) will control which remote units 606(1)-606(S) receive the downlink spectrum chunks 628D(1)-628D(Q). To provide for the ability to condition the interpolated downlink digital communications channels 618D(1)-618D(N) before being constructed into downlink spectrum chunks 628D(1)-628D(Q), the central unit 602 in FIG. 6A includes downlink conditioning circuits 646D(1)-646D(P) each communicatively coupled to a respective downlink routing output port 622D(1)-622D(P) of the downlink routing circuit 620. The downlink conditioning circuits 646D(1)-646D(P) are configured to condition a signal attribute (e.g., gain level, equalization, time delay, etc.) of an interpolated downlink digital communications channel 618D(1)-618D(N). For example, the downlink conditioning circuits 646D(1)-646D(P) may be configured to increase or decrease the magnitude of the interpolated downlink digital communications channels 618D(1)-618D(N) for automatic level or gain control. It should be noted that by this arrangement the properties of specific interpolated downlink digital communications channels 618D(1)-618D(N) may be changed differently per different target remote units 606(1)-606(S).

With continuing reference to FIG. 6A, before constructing the downlink spectrum chunks 628D(1)-628D(Q), the interpolated downlink digital communications channels 618D(1)-618D(N) may be combined into desired combinations, such as by a communications service. In this regard, the central unit 602 includes downlink channel combining circuits 648D(1)-648D(Q) configured to combine one or more of the interpolated downlink digital communications channels 618D(1)-618D(N) into respective single downlink spectrum chunks 628D(1)-628D(Q). For example, as illustrated in FIG. 6A, the downlink channel combining circuit 648D(1) combines different interpolated downlink digital communications channels 618D(1), 618D(2) for one or more communications bands to provide downlink spectrum chunks 628D(1)-628D(Q) comprising interpolated downlink digital communications channels 618D(1)-618D(N). For example, as shown, downlink spectrum chunk 628D(1) may be a first spectrum chunk for communications band 'A', downlink spectrum chunk 628D(2) may be a second spectrum chunk for communications band 'A', and downlink spectrum chunk 628D(3) may be a first spectrum chunk for communications band 'B'. Interpolated downlink digital communications channels 618D(1), 618D(2) correspond to downlink digital communications channels 610D(1), 610D(2). For example, the downlink channel combining circuit 648D(2) combines interpolated downlink digital communications channels 618D(3), 618D(N) for communications band 'B' to provide downlink spectrum chunk 628D(2). Interpolated downlink digital communications channels 618D(3), 618D(N) correspond to downlink digital communications channels 610D(3), 610D(N). "Zero" signals can be provided to a downlink channel combining circuit 648D(1)-648D(Q) if less interpolated downlink digital communications channels 618D than the capacity of the downlink channel combining circuit 648D(1)-648D(Q) are provided to the respective downlink channel combining circuit 648D(1)-648D(Q). Then, downlink spectrum chunks 628D(1)-628D(Q) from the downlink channel combining circuits 648D(1)-648D(Q) are provided to respective DS construction circuits 615(1)-615(N) to construct the downlink spectrum chunk streams 628SD(1)-628SD(S). Each downlink spectrum chunk stream 628SD(1)-628SD(S) may include multiple streams of spectrum chunks. For example, DS construction circuit 615(N) constructs downlink spectrum chunk stream 628SD(S) from downlink spectrum chunks 628D(Q-1), 628D(Q).

With continuing reference to FIG. 6A, the downlink spectrum chunks 628D(1)-628D(Q) are provided to DS construction circuits 615(1)-615(N) according to the routing by the downlink routing circuit 620. The DS construction circuits 615(1)-615(N) are each configured to merge one or more of the downlink spectrum chunks 628D(1)-628D(Q) into one or more downlink spectrum chunk streams 628SD(1)-628SD(S). Downlink output interfaces 630D(1)-630D(S) are provided that are coupled to one or more respective downlink communications medium 632D(1)-632D(S) communicatively coupled to the remote units 606(1)-606(S) to distribute the one or more downlink spectrum chunk streams 628SD(1)-628SD(S) to the remote units 606(1)-606(S). Thus, the downlink spectrum chunk streams 628SD(1)-628SD(S) received by the remote units 606(1)-606(S) are controlled by the routing of the interpolated downlink digital communications channels 618D(1)-618D(N) to the DS construction circuits 615(1)-615(N).

Figure 8:
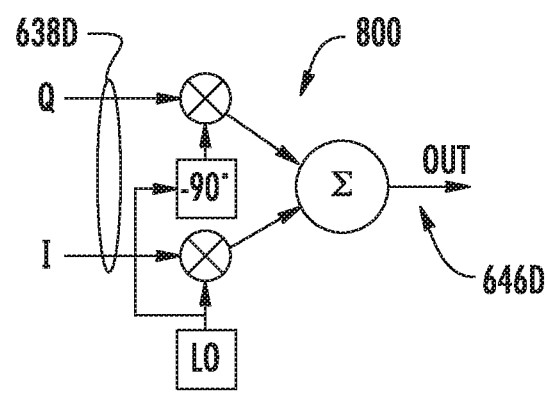
FIG. 8 is a schematic diagram of an analog frequency upshifter circuit that can be employed in the remote unit as shown in FIG. 6B.

With continuing reference to FIG. 6A, the remote units 606(1)-606(S) are shown as receiving the downlink spectrum chunk streams 628SD(1)-628SD(S) in this example. More detail on the downlink paths of the remote units 606(1)-606(S) is shown in FIG. 6B. FIG. 6B illustrates one remote unit 606, but it should be noted that the discussion of remote unit 606 can be applicable for any of the remote units 606(1)-606(S) in FIG. 6A. As shown in FIG. 6B, the remote unit 606 includes a downlink input interface 634D configured to receive the one or more downlink spectrum chunk streams 628SD(1)-628SD(S) from the central unit 602 (shown in FIG. 6A). For example, the downlink input interface 634D may be configured to convert optical signals to electrical signals for downlink spectrum chunk streams 628SD(1)-628SD(S) as optical signals. The downlink spectrum chunk streams 628SD(1)-628SD(S) received by the remote unit 606 are provided to a respective DS deconstruction circuit 663, which is configured to deconstruct or unmerge a received downlink spectrum chunk stream 628SD which in this example includes two I/Q streams in CPRI format representing two different downlink spectrum chunks 628D(1)-628D(Q) and extracts the two I/Q streams from the CPRI TDM frame into one or more individual downlink spectrum chunks 638D(A), 638D(B). In this example, the DS deconstruction circuit 663 is configured to deconstruct the received combined one or more downlink spectrum chunk streams 628SD(1)-628SD(S) into individual downlink spectrum chunks 638D(A), 638D(B) for communications bands 'A' and 'B' respectively. Digital-to-analog converter (DAC) circuits 640A, 640B are provided to convert the downlink spectrum chunks 638D(A), 638D(B) into one or more downlink analog spectrum chunks 642D(A), 642D(B). A frequency upshifter circuit 644A, 644B frequency upshifts the one or more downlink analog spectrum chunks 642D(A), 642D(B) into one or more corresponding downlink analog communications signals 647D(A), 647D(B) in respective frequency bandwidths for one or more respective communications bands. The frequency upshifter circuit 644A, 644B may be implemented as I/Q signal demodulator 800, such as shown in FIG. 8 for example, if the downlink spectrum chunks 642D(A), 642D(B) are provided in an I/Q signal format that is converted to a signal. The downlink analog communications signals 647D(A), 647D(B) may be provided to respective band pass filters (BPF) 650D(A), 650D(B) and amplified by downlink signal amplifiers 652D(A), 652D(B) to provide downlink analog communications signals 647D(A)', 647D(B)' to be distributed wirelessly by the antenna 608. A multiplexer circuit 653 may be provided to multiplex the antenna 608 between one or more downlink transmission and uplink reception paths.

Figure 9:
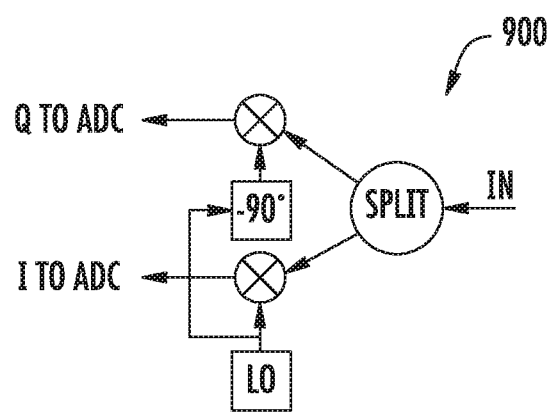
FIG. 9 is a schematic diagram of an analog frequency downshifter circuit that can be employed in the remote unit as shown in FIG. 7A.

FIG. 7A illustrates the uplink path and related components for the remote unit 606 in FIG. 6B. As illustrated in FIG. 7A, the remote unit 606 is configured to receive one or more uplink analog communications signals 647U' from the antenna 608. The uplink analog communications signals 647U' are split into two communications paths in this example to support up to two communications bands, which in this example are communications bands 'A' and 'B'. The uplink analog communications signals 647U(A)', 647U(B)' can be amplified by respective uplink signal amplifiers 652U(A), 652U(B) and filtered by respective band pass filters (BPFs) 650U(A), 650U(B) into uplink analog communications signals 647U(A), 647U(B). Frequency downshifter circuits 654A, 654B are provided that are configured to frequency downshift the uplink analog communications signals 647U(A), 647U(B) into frequency down-shifted uplink analog spectrum chunks 642U(A), 642U(B). For example, the frequency downshifter circuits 654A, 654B may be provided as an I/Q modulator circuit 900 as shown in FIG. 9 to convert the frequency down-shifted uplink analog spectrum chunks 642U(A), 642U(B) into an I/Q signal format to be processed digitally.

With reference back to FIG. 7A, analog-to-digital conversion (ADC) circuits 656A, 656B are provided that are configured to convert the frequency down-shifted uplink analog spectrum chunks 642U(A), 642U(B) into respective uplink digital communications chunks 636U(A), 636U(B). Digital down-converter (DDC) circuits 658A, 658B are provided that are configured to decimate the uplink digital communications chunks 636U(A), 636U(B) into one or more uplink spectrum chunks 660U(A), 660U(B). The DDC circuits 658A, 658B are configured to filter, decimate, and position the desired frequency portion of the uplink spectrum chunks 660U(A), 660U(B) at zero Hz. An uplink DS construction circuit 663 is configured to merge the uplink spectrum chunks 660U(A), 660U(B) into an uplink spectrum chunk stream 662SU comprising the uplink spectrum chunks 660U(A), 660U(B). The uplink spectrum chunk stream 662SU is communicated over the uplink communications medium 632U as a digital signal stream. It should be noted that the use of TDM/CPRI format for the uplink spectrum chunk stream 662SU is but one example, and other embodiments may use different protocols such as Ethernet.

FIG. 7B illustrates the uplink path and components of the central unit 602. As shown therein, the central unit 602 is configured to receive uplink spectrum chunk streams 662SU(1)-662SU(S) from the respective remote units 606(1)-606(S) in respective uplink input interfaces 664U(1)-664U(S). The central unit 602 includes a plurality of uplink input interfaces 664U(1)-664U(S) each coupled to the communications mediums 632U(1)-632U(S). The uplink input interfaces 664U(1)-664U(S) are each configured to receive at least one uplink input digital communications signal comprising an uplink spectrum chunk streams 662SU(1)-662SU(S) from the remote units 606(1)-606(S). A plurality of DS deconstruction circuits 666(1)-666(S) are provided to unmerge the received respective uplink spectrum chunk streams 662SU(1)-662SU(S) into respective uplink spectrum chunks 668U(1)-668U(Q). An uplink routing circuit 670 is provided that is configured to receive and route the uplink spectrum chunks 668U(1)-668U(Q) to a plurality of uplink routing output ports 672U(1)-672U(P) based on the routing map 624. The uplink routing circuit 670 is configured to segregate the like channels in the received uplink spectrum chunks 668U(1)-668U(Q) into uplink spectrum chunks 669U(1)-669U(N) that are routed to uplink routing output ports 672U(1)-672U(P) based on uplink spectrum chunks 668U(1)-668U(Q) that include a communications channel being routed to uplink spectrum chunk combining circuits 648U(1)-648U(N) to be processed by a particular signal source 612(1)-612(N). As a non-limiting example, only combining uplink spectrum chunks 669U(1)-669U(N) that include the required channel can avoid unnecessary accumulation of noise arriving from the sampled spectrum chunks which do not include the required channel.

With continuing reference to FIG. 7B, uplink conditioning circuits 646U(1)-646U(P) are provided that are coupled to the respective uplink routing output ports 672U(1)-672U(P) and are configured to receive and modify a signal attribute of the uplink spectrum chunks 669U(1)-669U(N). Uplink spectrum chunk combining circuits 648U(1)-648U (N) are provided that are each configured to combine received uplink spectrum chunks 669U(1)-669U(N) for a communications channel into uplink spectrum chunk streams 618SU(1)-618SU(N) at defined frequency channel band for the respective communications band. Digital down-conversion (DDC) circuits 616U(1)-616U(N) are provided that are configured to receive and frequency down-shift the uplink spectrum chunk streams 618SU(1)-618SU(N) into frequency down-shifted uplink spectrum chunk streams 610SU(1)-610SU(N) to be provided to the signal sources 612(1)-612(N). The DDC circuits 616U(1)-616U(N) in this example include the functionality of filtering, decimating, and positioning the desired frequency portion of the frequency down-shifted uplink spectrum chunk streams 610SU(1)-610SU(N) (spectrum chunk) at zero Hz frequency. In this example, the frequency down-shifted uplink spectrum chunk streams 610SU(1)-610SU(N) will be I/Q data streams representing combined decimated communications channels.

Note that any of the communications signals, bands, and services described herein may be RF communications signals, bands and services. Supported RF communications services in the WDCSs disclosed herein can include any communications bands desired. Examples of communication services include, but are not limited to, the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The communications bands may include licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink). Further, the WDCS can be configured to support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

Figure 10:
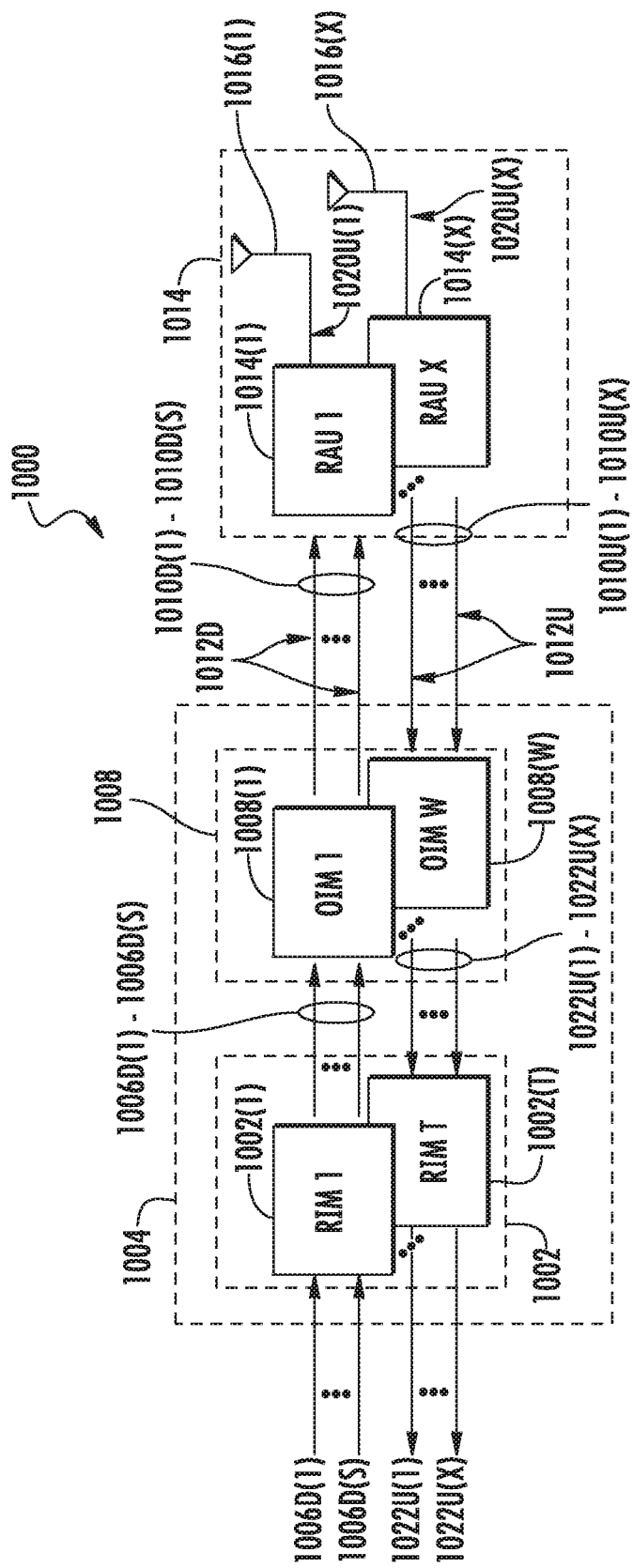
FIG. 10 is a schematic diagram of an exemplary WDCS provided in the form of an optical fiber-based DAS that includes a central unit employing centralized spectrum chunk construction for construction of spectrum chunks from individually received communications channels for distribution to remote units.

A WDCS employing spectrum chunk construction for construction of spectrum chunks from individually received communications channels for distribution to remote units can be provided as a distributed antenna system (DAS). In this regard, FIG. 10 is a schematic diagram of such an exemplary DAS 1000. The DAS 1000 in this example is an optical fiber-based DAS. The DAS 1000 in this example is comprised of three (3) main components. One or more radio interfaces provided in the form of radio interface modules (RIMs) 1002(1)-1002(T) are provided in a central unit 1004 to receive and process downlink electrical communications signals 1006D(1)-1006D(S) prior to optical conversion into downlink optical communications signals. The downlink electrical communications signals 1006D(1)-1006D(S) may be received from a base station (not shown) as an example. The RIMs 1002(1)-1002(T) provide both downlink and uplink interfaces for signal processing. The notations "1-S" and "1-T" indicate that any number of the referenced component, 1-S and 1-T, respectively, may be provided.

With continuing reference to FIG. 10, the central unit 1004 is configured to accept the plurality of RIMs 1002(1)-1002(T) as modular components that can easily be installed and removed or replaced in the central unit 1004. In one embodiment, the central unit 1004 is configured to support up to twelve (12) RIMs 1002(1)-1002(12). Each RIM 1002(1)-1002(T) can be designed to support a particular type of radio source or range of radio sources (i.e., frequencies) to provide flexibility in configuring the central unit 1004 and the DAS 1000 to support the desired radio sources. For example, one RIM 1002 may be configured to support the Personal Communication Services (PCS) radio band. Another RIM 1002 may be configured to support the 700 MHz radio band. In this example, by inclusion of these RIMs 1002, the central unit 1004 could be configured to support and distribute communications signals, including those for the communications services and communications bands described above as examples.

The RIMs 1002(1)-1002(T) may be provided in the central unit 1004 that support any frequencies desired, including but not limited to licensed US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 10, the downlink electrical communications signals 1006D(1)-1006D(S) may be provided as downlink electrical spectrum chunks to a plurality of optical interfaces provided in the form of optical interface modules (OIMs) 1008(1)-1008(W) in this embodiment to convert the unlicensed and/or licensed downlink electrical communications signals 1006D(1)-1006D(S) ("downlink electrical communications signals 1006D(1)-1006D(S)") into downlink optical spectrum chunks 1010D(1)-1010D(S). The notation "1-W" indicates that any number of the referenced component 1-W may be provided. The OIMs 1008 may be configured to provide one or more optical interface components (OICs) that contain optical-to-electrical (O-E) and electrical-to-optical (E-O) converters, as will be described in more detail below. The OIMs 1008 support the radio bands that can be provided by the RIMs 1002, including the examples previously described above.

The OIMs 1008(1)-1008(W) each include E-O converters to convert the downlink electrical communications signals 1006D(1)-1006D(S) into the downlink optical spectrum chunks 1010D(1)-1010D(S). The downlink optical spectrum chunks 1010D(1)-1010D(S) are communicated over downlink optical fiber communications medium 1012D to a plurality of remote units provided in the form of remote antenna units 1014(1)-1014(X). The notation "1-X" indicates that any number of the referenced component 1-X may be provided. O-E converters provided in the remote antenna units 1014(1)-1014(X) convert the downlink optical spectrum chunks 1010D(1)-1010D(S) back into the downlink electrical communications signals 1006D(1)-1006D(S), which are provided to antennas 1016(1)-1016(X) in the remote antenna units 1014(1)-1014(X) to user equipment (not shown) in the reception range of the antennas 1016(1)-1016(X).

E-O converters are also provided in the remote antenna units 1014(1)-1014(X) to convert uplink electrical communications signals 1020U(1)-1020U(X) received from user equipment (not shown) through the antennas 1016(1)-1016(X) into uplink optical spectrum chunks 1010U(1)-1010U(X). The remote antenna units 1014(1)-1014(X) communicate the uplink optical spectrum chunks 1010U(1)-1010U(X) over an uplink optical fiber communications medium 1012U to the OIMs 1008(1)-1008(W) in the central unit 1004. The OIMs 1008(1)-1008(W) include O-E converters that convert the received uplink optical spectrum chunks 1010U(1)-1010U(X) into uplink electrical communications signals 1022U(1)-1022U(X), which are processed by the RIMs 1002(1)-1002(T) and provided as uplink electrical communications signals 1022U(1)-1022U(X). The central unit 1004 may provide the uplink electrical communications signals 1022U(1)-1022U(X) to a source transceiver such as a base station or other communications system.

Note that the downlink optical fiber communications medium 1012D and uplink optical fiber communications medium 1012U connected to each remote antenna unit 1014(1)-1014(X) may be a common optical fiber communications medium, wherein for example, wave division multiplexing (WDM) may be employed to provide the downlink optical communications signals 1010D(1)-1010D(S) and the uplink optical communications signals 1010U(1)-1010U(X) on the same optical fiber communications medium.

Figure 11:
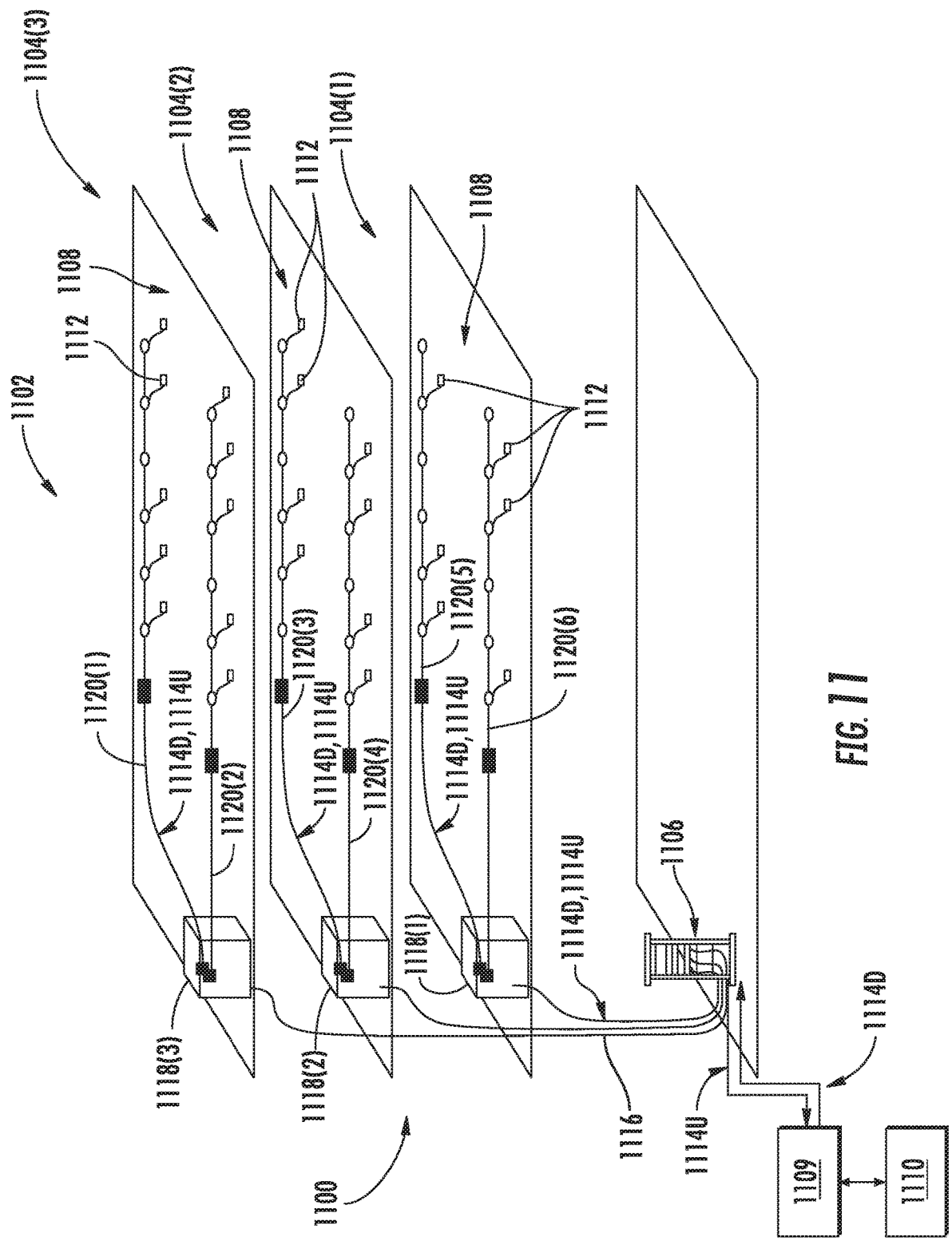
FIG. 11 is a partially schematic cut-away diagram of an exemplary building infrastructure in which a WDCS, including but not limited to the digital WDCSs and central units and remote units in FIGS. 3 and 6A-7B can be provided, employing centralized spectrum chunk construction for construction of spectrum chunks from individually received communications channels for distribution to remote units.

A WDCS employing spectrum chunk construction for construction of spectrum chunks from individually received communications channels for distribution to remote units, including but not limited to the WDCSs in FIGS. 3 and 6A-7B, can be provided in an indoor environment, such as illustrated in FIG. 11. In this regard, FIG. 11 is a partially schematic cut-away diagram of a building infrastructure 1100 employing a WDCS 1102 employing a programmable digital signal processing circuit for scaling supported communications services. The building infrastructure 1100 in this embodiment includes a first (ground) floor 1104(1), a second floor 1104(2), and a third floor 1104(3). The floors 1104(1)-1104(3) are serviced by the central unit 1106 to provide the antenna coverage areas 1108 in the building infrastructure 1100. The central unit 1106 is communicatively coupled to a base station 1109 to receive downlink communications signals 1114D from the base station 1109. The base station 1109 may be coupled to an operational and support system (OSS) 1110 to receive data about the performance of remote antenna units 1112 in the WDCS 1102 on a per remote unit basis for determining WDCS optimizations. The central unit 1106 is communicatively coupled to the remote antenna units 1112 to receive uplink communications signals 1114U from the remote antenna units 1112, similar to as previously discussed above for other WDCSs. The central unit 1106 may be configured to employ spectrum chunk construction for construction of spectrum chunks from individually received communications channels for distribution to remote antenna units 1112. The downlink and uplink communications signals 1114D, 1114U communicated between the central unit 1106 and the remote antenna units 1112 are carried over a riser cable 1116 in this example. The riser cable 1116 may be routed through interconnect units (ICUs) 1118(1)-1118(3) dedicated to each floor 1104(1)-1104(3) that route the downlink and uplink communications signals 1114D, 1114U to the remote antenna units 1112 and also provide power to the remote antenna units 1112 via array cables 1120(1)-1120(6).

Figure 12:
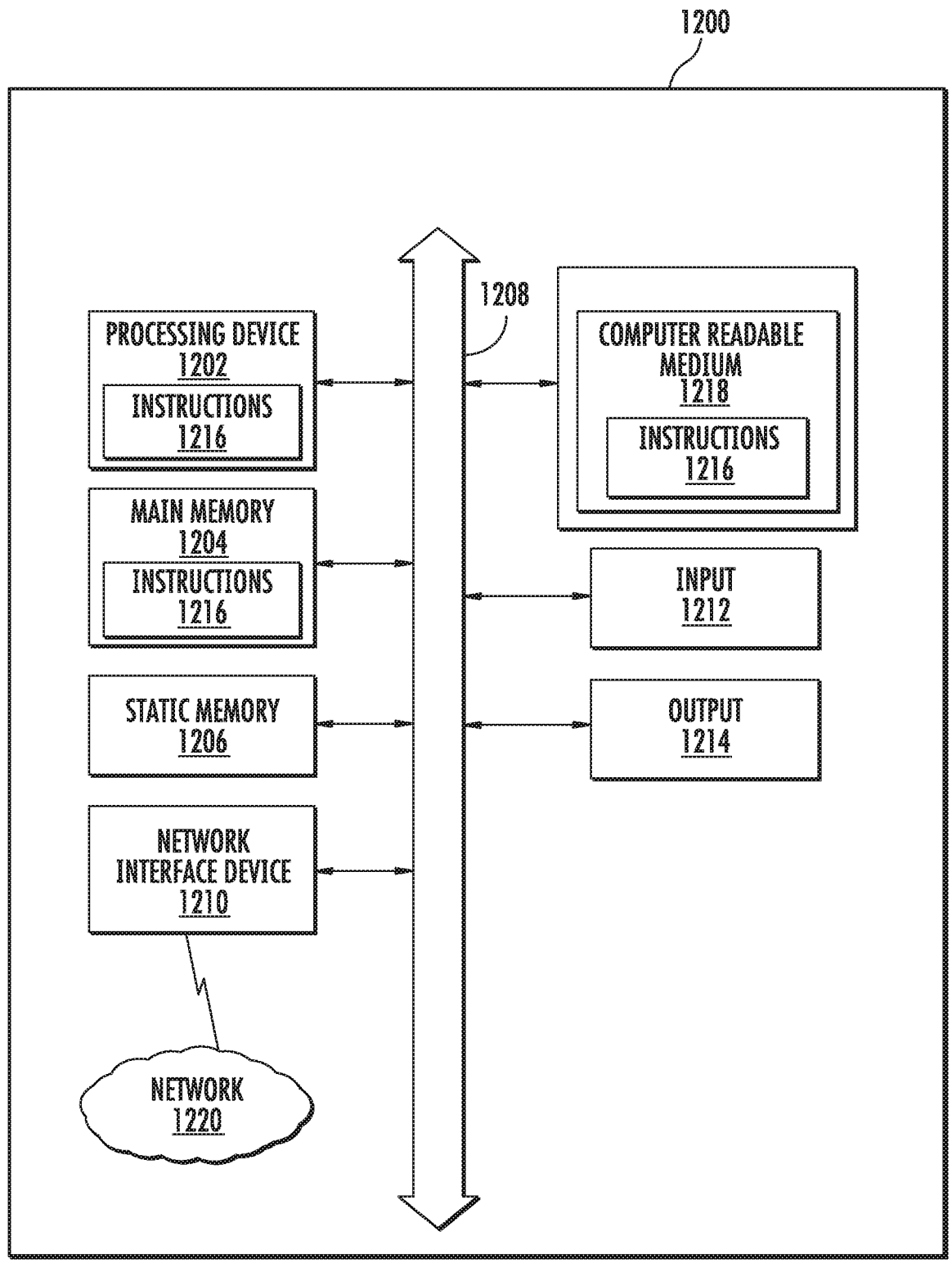
FIG. 12 is a schematic diagram of a generalized representation of an exemplary controller that can be included in any component in a WDCS, including but not limited to the digital WDCSs and central units and remote units in FIGS. 3 and 6A-7B, for processing communications signals, including centralized spectrum chunk construction for construction of spectrum chunks from individually received communications channels for distribution to remote units, wherein an exemplary computer system is adapted to execute instructions from an exemplary computer readable link.

FIG. 12 is a schematic diagram representation of additional detail illustrating a computer system 1200 that could be employed in any of the circuits in a WDCS employing spectrum chunk construction for construction of spectrum chunks from individually received communications channels for distribution to remote units, including but not limited to the WDCSs in FIGS. 3 and 6A-7B. For example, the computer system 1200 could provide the control circuits 326, 626, the DUC circuits 316(1)-316(S), 616D(1)-616D(N), the DDC circuits 616U(1)-616U(N), 658A, 658B, the band construction circuits 315(1)-315(N), 615(1)-615(N), 663, and the DS deconstruction circuits 336(1)-336(N), 663, 666(1)-666(S) as examples. In this regard, the computer system 1200 is adapted to execute instructions from an exemplary computer-readable medium to perform these and/or any of the functions or processing described herein.

In this regard, the computer system 1200 in FIG. 12 may include a set of instructions that may be executed to program and configure programmable digital signal processing circuits in a WDCS for supporting scaling of supported communications services. The computer system 1200 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1200 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1200 in this embodiment includes a processing device or processor 1202, a main memory 1204 (e.g., read-only memory (ROM), flash memory, dynamic random access memory (DRAM), such as synchronous DRAM (SDRAM), etc.), and a static memory 1206 (e.g., flash memory, static random access memory (SRAM), etc.), which may communicate with each other via a data bus 1208. Alternatively, the processor 1202 may be connected to the main memory 1204 and/or static memory 1206 directly or via some other connectivity means. The processor 1202 may be a controller, and the main memory 1204 or static memory 1206 may be any type of memory.

The processor 1202 represents one or more general-purpose processing devices, such as a microprocessor, central processing unit, or the like. More particularly, the processor 1202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1202 is configured to execute processing logic in instructions for performing the operations and steps discussed herein.

The computer system 1200 may further include a network interface device 1210. The computer system 1200 also may or may not include an input 1212, configured to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processor 1202 during execution thereof by the computer system 1200, the main memory 1204 and the processor 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A central unit in a digital wireless distributed communications system (WDCS), comprising:
    a plurality of downlink input interfaces each configured to receive a downlink digital communications channel among a plurality of downlink digital communications channels, from a signal source among a plurality of signal sources;
    a plurality of digital up-converter (DUC) circuits each configured to:
        receive a respective downlink digital communications channel among the plurality of downlink digital communications channels;
        interpolate the downlink digital communications channel to a defined sample rate for a target bandwidth of a downlink spectrum chunk of one or more downlink spectrum chunks into an interpolated downlink digital communications channel; and
        frequency up-shift the interpolated downlink digital communications channel at a defined position in the downlink spectrum chunk of the one or more downlink spectrum chunks;
    a downlink routing circuit configured to receive the interpolated downlink digital communications channels interpolated by the plurality of DUC circuits and route each of the interpolated downlink digital communications channels each corresponding to a downlink spectrum chunk of the one or more downlink spectrum chunks to one or more downlink routing output ports among a plurality of downlink routing output ports based on a downlink routing map;
    at least one data stream (DS) construction circuit configured to combine the one or more downlink spectrum chunks routed to the one or more downlink routing output ports, into one or more downlink spectrum chunk streams; and
    at least one downlink output interface coupled to at least one communications medium communicatively coupled to at least one remote unit among a plurality of remote units, the at least one downlink output interface configured to distribute the one or more downlink spectrum chunk streams to the at least one remote unit.

2. The central unit of claim 1, wherein at least one downlink input interface among the plurality of downlink input interfaces is configured to receive the downlink digital communications channel from a digital signal source.

3. The central unit of claim 2, wherein the at least one downlink input interface among the plurality of downlink input interfaces is configured to receive a downlink digital baseband communications channel from a baseband digital signal source.

4. The central unit of claim 3, wherein the at least one downlink input interface among the plurality of downlink input interfaces comprises at least one common public radio interface (CPRI) protocol interface.

5. The central unit of claim 1, wherein at least one downlink input interface among the plurality of downlink input interfaces is configured to receive a downlink analog communications channel, and further comprising:
    at least one analog-to-digital converter (ADC) circuit configured to convert the downlink analog communications channel into the downlink digital communications channel.

6. The central unit of claim 1, further comprising a control circuit configured to control a first set of DUC circuits among the plurality of DUC circuits to frequency up-shift a first set of downlink digital communications channels among the plurality of downlink communications channels corresponding to a first communications band, into a first set of interpolated downlink digital communications channels in first defined, non-overlapping frequency channel bands of a first downlink spectrum chunk of the one or more downlink spectrum chunks, the first downlink spectrum chunk having a first frequency bandwidth.

7. The central unit of claim 6, wherein the control circuit is configured to control a second set of DUC circuits among the plurality of DUC circuits to frequency up-shift a second set of downlink digital communications channels among the plurality of downlink communications channels corresponding to a second communications band, into a second set of interpolated downlink digital communications channels in second defined, non-overlapping frequency channel bands of a second downlink spectrum chunk of the one or more downlink spectrum chunks, the second downlink spectrum chunk having a second frequency bandwidth.

8. The central unit of claim 7, wherein the first frequency bandwidth of the first downlink spectrum chunk does not overlap the second frequency bandwidth of the second downlink spectrum chunk.

9. The central unit of claim 7, further comprising one or more downlink channel combining circuits each configured to combine the one or more downlink spectrum chunks routed to the one or more downlink routing output ports into a downlink spectrum chunk of the one or more downlink spectrum chunks;
    the at least one DS construction circuit configured to merge the one or more downlink spectrum chunks into a downlink spectrum chunk stream of the one or more downlink spectrum chunk streams.

10. The central unit of claim 1, further comprising at least one downlink conditioning circuit each communicatively coupled to a respective downlink routing output port among the plurality of downlink routing output ports, the at least one downlink conditioning circuit configured to condition a signal attribute of an interpolated downlink digital communications channel received from the respective downlink routing output port.

11. The central unit of claim 10, wherein the at least one downlink conditioning circuit is configured to condition the signal attribute of the interpolated downlink digital communications channel by being configured to increase a magnitude of the interpolated downlink digital communications channel.

12. The central unit of claim 10, wherein the at least one downlink conditioning circuit is configured to condition the signal attribute of the interpolated downlink digital communications channel by being configured to decrease a magnitude of the interpolated downlink digital communications channel.

13. The central unit of claim 1, further comprising:
a plurality of uplink input interfaces each coupled to the at least one communications medium, the plurality of uplink input interfaces each configured to receive at least one uplink input digital communications signal comprising a plurality of uplink spectrum chunk streams from at least one remote unit;
a plurality of DS deconstruction circuits each configured to unmerge at least one uplink spectrum chunk stream of the plurality of uplink spectrum chunk streams into one or more uplink spectrum chunks;
an uplink routing circuit configured to receive and route the one or more uplink spectrum chunks from the plurality of DS deconstruction circuits to a plurality of uplink routing output ports based on an uplink routing map;
one or more uplink spectrum chunk combining circuits each configured to combine the one or more uplink spectrum chunks for a communications channel into an uplink spectrum chunk stream at a defined frequency channel band;
at least one digital down-conversion (DDC) circuit configured to receive and frequency down-shift the uplink spectrum chunk stream into one or more frequency down-shifted uplink digital communications channels; and
at least one uplink output interface configured to receive and distribute the one or more frequency down-shifted uplink digital communications channels to a signal source among a plurality of signal sources.

14. The central unit of claim 13, further comprising a plurality of uplink conditioning circuits each communicatively coupled to a respective uplink routing output port among the plurality of uplink routing output ports, the plurality of uplink conditioning circuits each configured to condition a signal attribute of an uplink spectrum chunk among the one or more uplink spectrum chunks.

15. The central unit of claim 1, further comprising:
a plurality of electrical-to-optical (E-O) converters configured to receive and convert at least one downlink output digital communications signal into at least one downlink output digital optical communications signal;
the at least one downlink output interface configured to distribute the at least one downlink output digital optical communications signal to the at least one remote unit.

16. A method of distributing spectrum chunks from a central unit in a digital wireless distributed communications system (WDCS) to a plurality of remote units, comprising:
receiving a plurality of downlink digital communications channels from a plurality of signal sources;
interpolating each of the plurality of downlink digital communications channels to a respective defined sample rate for a target bandwidth of a downlink spectrum chunk of one or more downlink spectrum chunks into a respective interpolated downlink digital communications channel; and
frequency up-shifting each of the interpolated downlink digital communications channels at a defined position in the respective downlink spectrum chunk of the one or more downlink spectrum chunks;
routing each of the plurality of interpolated downlink digital communications channels each corresponding to a downlink spectrum chunk of the one or more downlink spectrum chunks to one or more downlink routing output ports among a plurality of downlink routing output ports based on a downlink routing map;
combining the one or more downlink spectrum chunks routed to the one or more downlink routing output ports, into one or more downlink spectrum chunk streams; and
distributing the one or more downlink spectrum chunk streams to at least one remote unit.

17. The method of claim 16, comprising:
receiving a plurality of downlink communications channels from a plurality of signal sources as a plurality of downlink analog communications channels; and
converting the plurality of downlink analog communications channels into a downlink digital communications channel.

18. The method of claim 16, further comprising controlling a first set of digital up-converter (DUC) circuits among a plurality of DUC circuits to frequency up-shift a first set of downlink digital communications channels among the plurality of downlink digital communications channels corresponding to a first communications band, into a first set of interpolated downlink digital communications channels in first defined, non-overlapping frequency channel bands of a first downlink spectrum chunk of the one or more downlink spectrum chunks, the first downlink spectrum chunk having a first frequency bandwidth.

19. The method of claim 18, further comprising controlling a second set of DUC circuits among the plurality of DUC circuits to frequency up-shift a second set of downlink digital communications channels among the plurality of downlink digital communications channels corresponding to a second communications band, into a second set of interpolated downlink digital communications channels in second defined, non-overlapping frequency channel bands of a second downlink spectrum chunk of the one or more downlink spectrum chunks, the second downlink spectrum chunk having a second frequency bandwidth.

20. The method of claim 19, comprising combining the one or more downlink spectrum chunks routed to the one or more downlink routing output ports into a downlink spectrum chunk of the one or more downlink spectrum chunks, and comprising:

merging the one or more downlink spectrum chunks into a downlink spectrum chunk stream of the one or more downlink spectrum chunk streams.

21. The method of claim 16, conditioning a signal attribute of an interpolated downlink digital communications channel received from a respective downlink routing output port.

22. The method of claim 16, further comprising:
receiving at least one uplink spectrum chunk stream from at least one remote unit;
unmerging the at least one uplink spectrum chunk stream of a plurality of uplink spectrum chunk streams into one or more uplink spectrum chunks;
routing the one or more uplink spectrum chunks to a plurality of uplink routing output ports based on an uplink routing map combining one or more uplink spectrum chunks for a communications channel into an uplink spectrum chunk stream at a defined frequency channel band;
frequency down-shifting the uplink spectrum chunk stream into one or more frequency down-shifted uplink digital communications channels; and
distributing the one or more frequency down-shifted uplink digital communications channels to a signal source among a plurality of signal sources.

23. The method of claim 22, further comprising conditioning a signal attribute of an interpolated uplink digital communications channel among the one or more uplink spectrum chunks.

24. The method of claim 16, further comprising in a remote unit:
receiving the one or more downlink spectrum chunk streams from the central unit;
deconstructing the one or more downlink spectrum chunk streams into one or more individual downlink spectrum chunks;
converting the one or more individual downlink spectrum chunks into one or more downlink analog spectrum chunks;
frequency upshifting the one or more downlink analog spectrum chunks into one or more downlink analog communications signals having one or more respective frequency bandwidths for one or more respective communications bands; and
wirelessly distributing the one or more downlink analog communications signals.

25. The method of claim 24, further comprising in a remote unit:
receiving one or more uplink analog communications signals from at least one antenna;
converting the one or more uplink analog communications signals into one or more uplink digital communications signals;
down-converting the one or more uplink digital communications signals into one or more uplink spectrum chunks; and
merging the one or more uplink spectrum chunks into one or more uplink spectrum chunk streams.

26. The method of claim 25, further comprising frequency down-shifting the received one or more uplink analog communications signals into one or more frequency down-shifted uplink analog communications signals, and comprising:
converting the one or more frequency down-shifted uplink analog communications signals into the one or more uplink digital communications signals.

* * * * *